US008899705B2

(12) United States Patent
Iguchi et al.

(10) Patent No.: US 8,899,705 B2
(45) Date of Patent: Dec. 2, 2014

(54) DECOLORING APPARATUS CAPABLE OF DISPLAYING REUSE RATIO OF DECOLORED SHEETS

(75) Inventors: Ken Iguchi, Shizuoka-ken (JP); Hiroyuki Taki, Shizuoka-ken (JP); Hiroyuki Tsuchihashi, Shizuoka-ken (JP); Isao Yahata, Shizuoka-ken (JP); Hiroyuki Taguchi, Shizuoka-ken (JP); Takahiro Kawaguchi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 925 days.

(21) Appl. No.: 13/069,285

(22) Filed: Mar. 22, 2011

(65) Prior Publication Data
US 2011/0235075 A1    Sep. 29, 2011

Related U.S. Application Data

(60) Provisional application No. 61/317,219, filed on Mar. 24, 2010, provisional application No. 61/317,226, filed on Mar. 24, 2010, provisional application No. 61/317,225, filed on Mar. 24, 2010, provisional application No. 61/317,209, filed on Mar. 24, 2010, provisional application No. 61/317,213, filed on Mar. 24, 2010.

(51) Int. Cl.
*B41J 2/01* (2006.01)
*H04N 1/23* (2006.01)
*H04N 1/00* (2006.01)
*H04N 1/21* (2006.01)
*B41M 7/00* (2006.01)

(52) U.S. Cl.
CPC ............ *H04N 1/00567* (2013.01); *H04N 1/23* (2013.01); *H04N 1/2376* (2013.01); *H04N 1/2392* (2013.01); *B41M 7/0009* (2013.01); *H04N 1/2162* (2013.01); *H04N 1/2323* (2013.01); *H04N 1/00716* (2013.01)
USPC .............................................................. 347/1

(58) Field of Classification Search
USPC .................................. 347/1; 358/1.15; 399/15
See application file for complete search history.

(56) References Cited

U.S. PATENT DOCUMENTS 5,572,311 A    11/1996    Abe et al.
5,612,766 A     3/1997    Iida et al.
(Continued)

FOREIGN PATENT DOCUMENTS

JP    H05-181442    7/1993
JP    H05-289575    11/1993
(Continued)

OTHER PUBLICATIONS

Search Report mailed Jul. 6, 2011, in European counterpart Application No. 11158956.0, 4 pages.
(Continued)

*Primary Examiner* — Eric A Rust
(74) *Attorney, Agent, or Firm* — Patterson & Sheridan LLP

(57) ABSTRACT

A decoloring apparatus includes a decoloring processing unit, a sheet conveying unit, an image reading unit arranged further on an upstream side in the sheet conveying direction than the decoloring processing unit, a thickness sensor arranged further on the upstream side in the sheet conveying direction than the decoloring processing unit, a decolorability determining unit configured to determine, on the basis of a detection result in at least one of the image readinq unit and the thickness sensor, executability of decoloring processing in the decoloring processing unit, a storing unit configured to store information indicating a number of sheets determined to be unexecutable for decoloring processing, and a display control unit configured to cause the information indicating the number of sheets determined to be unexecutable for decoloring processing to be displayed.

31 Claims, 41 Drawing Sheets

(56) References Cited

U.S. PATENT DOCUMENTS

| | | |
|---|---|---|
| 6,373,575 B1 * | 4/2002 | Takayama et al. ............ 356/445 |
| 7,283,758 B2 | 10/2007 | Murakami |
| 8,526,037 B2 | 9/2013 | Emori et al. |
| 2006/0115283 A1 | 6/2006 | Yamauchi et al. |
| 2011/0236843 A1 | 9/2011 | Iguchi et al. |

FOREIGN PATENT DOCUMENTS

| | | |
|---|---|---|
| JP | 2005-088506 | 4/2005 |
| JP | 2005-128046 | 5/2005 |
| JP | 2005-257995 | 9/2005 |
| JP | 2008-102783 | 5/2008 |
| JP | 2008-168994 | 7/2008 |
| JP | 2010-027036 | 2/2010 |

OTHER PUBLICATIONS

English translation of Japanese Office Action dated Sep. 3, 2013, filed in corresponding Japanese Patent Application No. 2011-064866.

Office Action dated Oct. 24, 2013, filed in Chinese counterpart Application No. 201110056791.6, with English translation.

* cited by examiner

FIG.5

| DECOLORING PROCESSING ID | PROCESSING EXECUTION DAY | USER ID | DEPARTMENT | COMPANY | NUMBER OF DECOLORING PROCESSING EXECUTED SHEETS | NUMBER OF DECOLORING PROCESSING SUCCESSFUL SHEETS | NUMBER OF DECOLORING PROCESSING UNSUCCESSFUL SHEETS ||||
|---|---|---|---|---|---|---|---|---|---|---|
| | | | | | | | UNDECOLORED IMAGE REMAINS | BEND/TEAR | SHEETS ARE BUNDLED | OBJECT REMAINS ON SHEET |
| | | | | | | | | | | |
| | | | | | | | | | | |
| | | | | | | | | | | |
| | | | | | | | | | | |
| | | | | | | | | | | |
| | | | | | | | | | | |

FIG.6

| DECOLORING PROCESSING ID | TOTAL NUMBER OF ECOLORING UNSUCCESSFUL SHEETS | REUSE RATIO | IMPROVEMENT CONTENT GUIDANCE ID | ENVIRONMENTAL LOAD CONTRIBUTION RATIO |
|---|---|---|---|---|
| | | | | |
| | | | | |
| | | | | |
| | | | | |
| | | | | |

FIG.7

| PERIOD | NUMBER OF IN-PERIOD PRINTED SHEETS | NUMBER OF IN-PERIOD DECOLORING PROCESSING EXECUTED SHEETS | NUMBER OF IN-PERIOD DECOLORING PROCESSING SUCCESSFUL SHEETS |
|---|---|---|---|
| | | | |
| | | | |
| | | | |
| | | | |
| | | | |

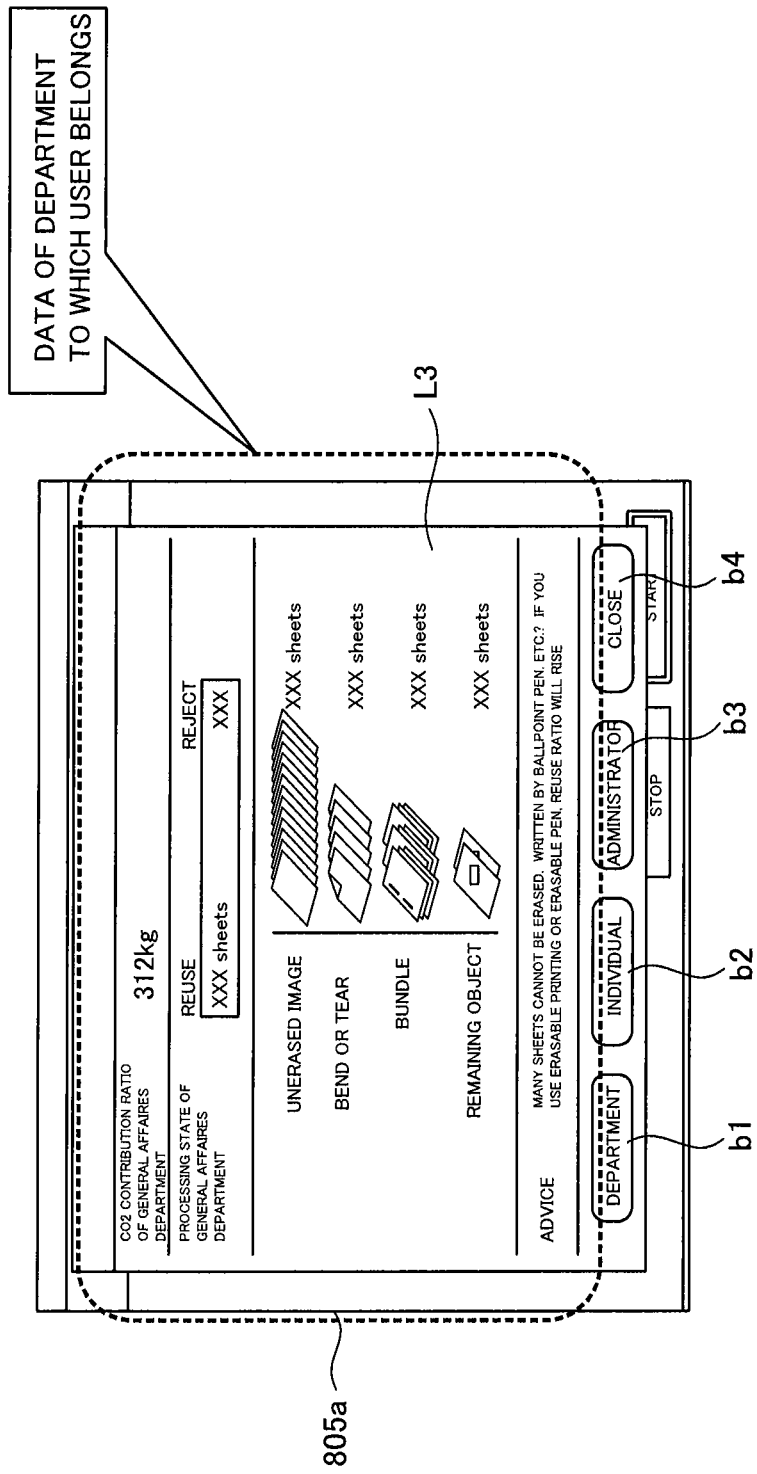

DECOLORING APPARATUS CAPABLE OF DISPLAYING REUSE RATIO OF DECOLORED SHEETS

CROSS-REFERENCE TO RELATED APPLICATION(S)

This application is based upon and claims the benefit of priority from: U.S. provisional application 61/317,219, filed on Mar. 24, 2010; U.S. provisional application 61/317,226, filed on Mar. 24, 2010; U.S. provisional application 61/317,225, filed on Mar. 24, 2010; U.S. provisional application 61/317,209, filed on Mar. 24, 2010; and U.S. provisional application 61/317,213, filed on Mar. 24, 2010; the entire contents all of which are incorporated herein by reference.

FIELD

Embodiments described herein relate generally to an information display technique in an decoloring apparatus that decolors a color of an image formed with an decolorable colorant.

BACKGROUND

In the past, an decoloring apparatus has been known that applies heating processing to a sheet, on which an image is formed with a so-called decolorable colorant, to decolor a color of the image on the sheet and makes the sheet reusable.

An decoloring apparatus has also been known that determines whether various sheets to be subjected to decoloring processing are decolorable and determines whether the decoloring processing is successful.

In the decoloring processing in the decoloring apparatus, in some case, the decoloring processing cannot be executed or cannot be sufficiently performed because there is a tear or a bend in a sheet to be subjected to the decoloring processing or a stapled bundle of sheets is directly set.

When a viewpoint of a reduction in an environmental load is taken into account, it is important to grasp information concerning a processing state of the decoloring processing in the decoloring apparatus. However, in a user interface screen in the past, it is difficult to grasp such information.

DESCRIPTION OF THE DRAWINGS

FIG. 5 is a diagram of an example of a data table of logs of various kinds of processing accumulated in a HDD 804;

FIG. 6 is a diagram of an example of the data table of logs of various kinds of processing accumulated in the HDD 804;

FIG. 7 is a diagram of an example of the data table of logs of various kinds of processing accumulated in the HDD 804;

FIG. 41 is a diagram of an example of a screen L3 on which a totalization result and the like are shown.

DETAILED DESCRIPTION

In general, according to one embodiment, a decoloring apparatus includes a sheet conveying unit, a decolorinq unit, a reading unit, a controlling unit, a storing unit and a display control unit. The sheet conveying unit conveys the sheet. The decoloring unit decolors a color of the image formed with a decolorable colorant on the sheet conveyed by the sheet conveying unit. The reading unit reads a sheet conveyed by the sheet conveying unit and acquires an image. The controlling unit determines whether or not the sheet is reusable based on the image which the reading unit acquired. The storing unit stores a first number of sheets which the controlling unit determines whether or not they are reusable, a second number of sheets determined to be reusable, and a third number of sheets determined not to be reusable. The display control unit causes a display unit to display the information indicating at least one of the second number, the third number and the reuse ratio of the second number of sheets to the first number of sheets.

Embodiments are explained below with reference to the accompanying drawings.

First Embodiment

First, a first embodiment is explained.

Figure 1:
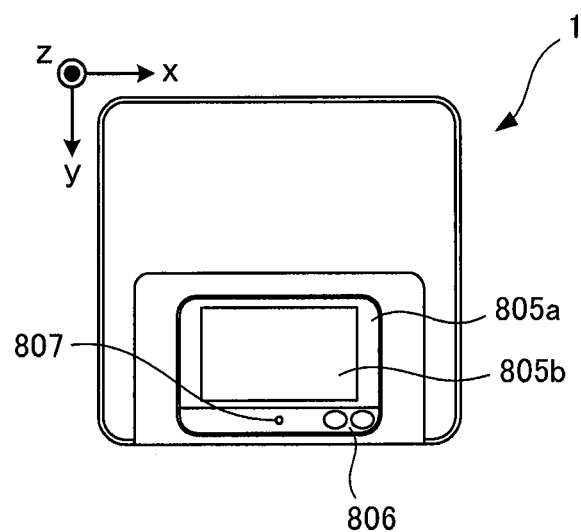
FIG. 1 is a plan view of an external appearance of an decoloring apparatus E according to a first embodiment viewed from above.
Figure 2:
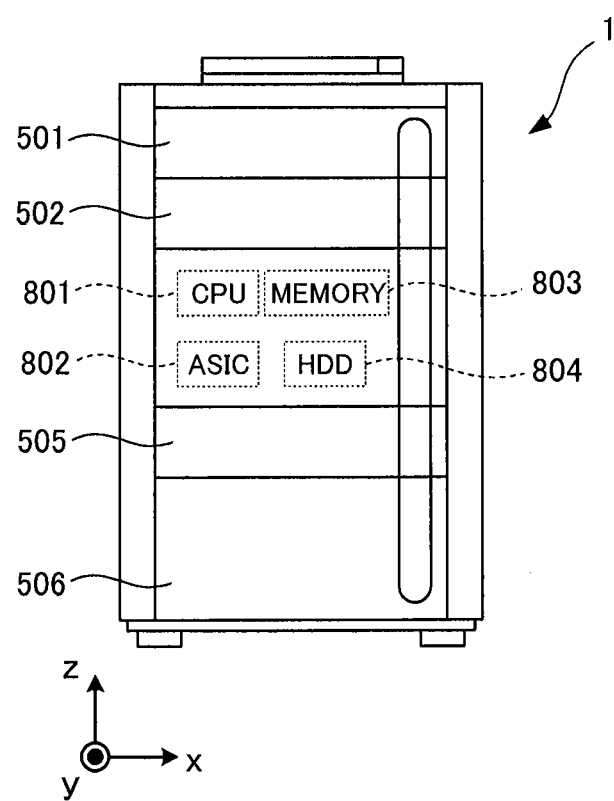
FIG. 2 is a front view of the external appearance of the decoloring apparatus E according to the first embodiment viewed from the front.

FIG. 1 is a plan view of the external appearance of an decoloring apparatus E according to the first embodiment viewed from above. FIG. 2 is a front view of the external appearance of the decoloring apparatus E according to the first embodiment viewed from the front.

The decoloring apparatus E subjects a sheet on which an image is formed with an "decolorable colorant" such as a so-called decolorable toner or decolorable ink to "decoloring processing" for decoloring a color of the decolorable colorant.

As shown in FIGS. 1 and 2, the decoloring apparatus E according to the first embodiment includes a processor 801, an ASIC (Application Specific Integrated Circuit) 802, a memory 803 (equivalent to a storing unit), a HDD (Hard Disk Drive) 804 (equivalent to a storing unit), a display unit 805a, a touch panel-type operation unit 805b (equivalent to an operation input unit), a button-type operation unit 806 (equivalent to an operation input unit), an IC card reader 807, feeding cassettes 505 and 506, discharge cassettes 501 and 502, and a reject box 509.

The display unit 805a can include, for example, an electronic paper, an LCD (Liquid Crystal Display), an EL (Electronic Luminescence), a PDP (Plasma Display Panel), or a CRT (Cathode Ray Tube).

The display unit 805a and the touch panel-type operation unit 805b cooperate with each other, whereby a so-called touch panel display is realized.

In the decoloring apparatus E according to this embodiment, the processor 801 has a role of performing various kinds of processing in the decoloring apparatus E. The processor 801 also has a role of realizing various functions by executing computer programs stored in the memory 803, the HDD 804, and the like. It goes without saying that the processor 801 can also be realized by a CPU (Central Processing Unit) or an MPU (Micro Processing Unit) that can execute equivalent arithmetic processing. Similarly, the HDD 804 can be replaced with a storage device such as a flash memory.

The memory 803 can include, for example, a RAM (Random Access Memory), a ROM (Read Only Memory), a DRAM (Dynamic Random Access Memory), an SRAM (Static Random Access Memory), a VRAM (Video RAM), or a flash memory. The memory 803 has a role of storing various kinds of information and computer programs used in the decoloring apparatus E.

The IC card reader 807 reads ID information of a user from an IC card carried by the user. The processor 801 performs personal authentication processing on the basis of the ID information read by the IC card reader 807.

The processor 801 and the ASIC 802 can perform information transmission and reception with external apparatuses such as a network server and an image forming apparatus (MFP: Multi Function Peripheral) through, for example, a LAN line.

An internal configuration of the decoloring apparatus E is explained in detail below.

Figure 3:
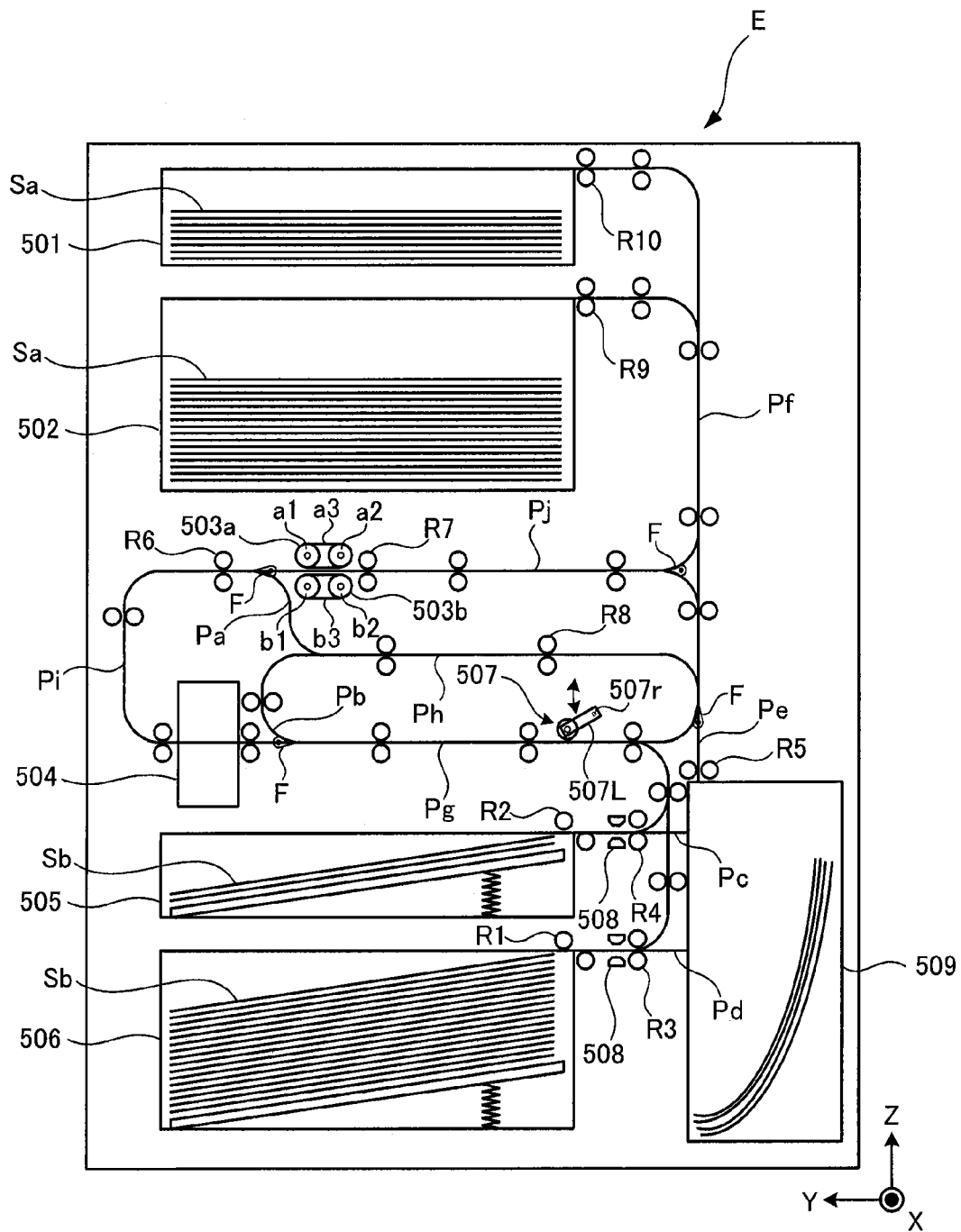
FIG. 3 is a longitudinal sectional view of an internal configuration of the decoloring apparatus E according to the first embodiment.
Figure 4:
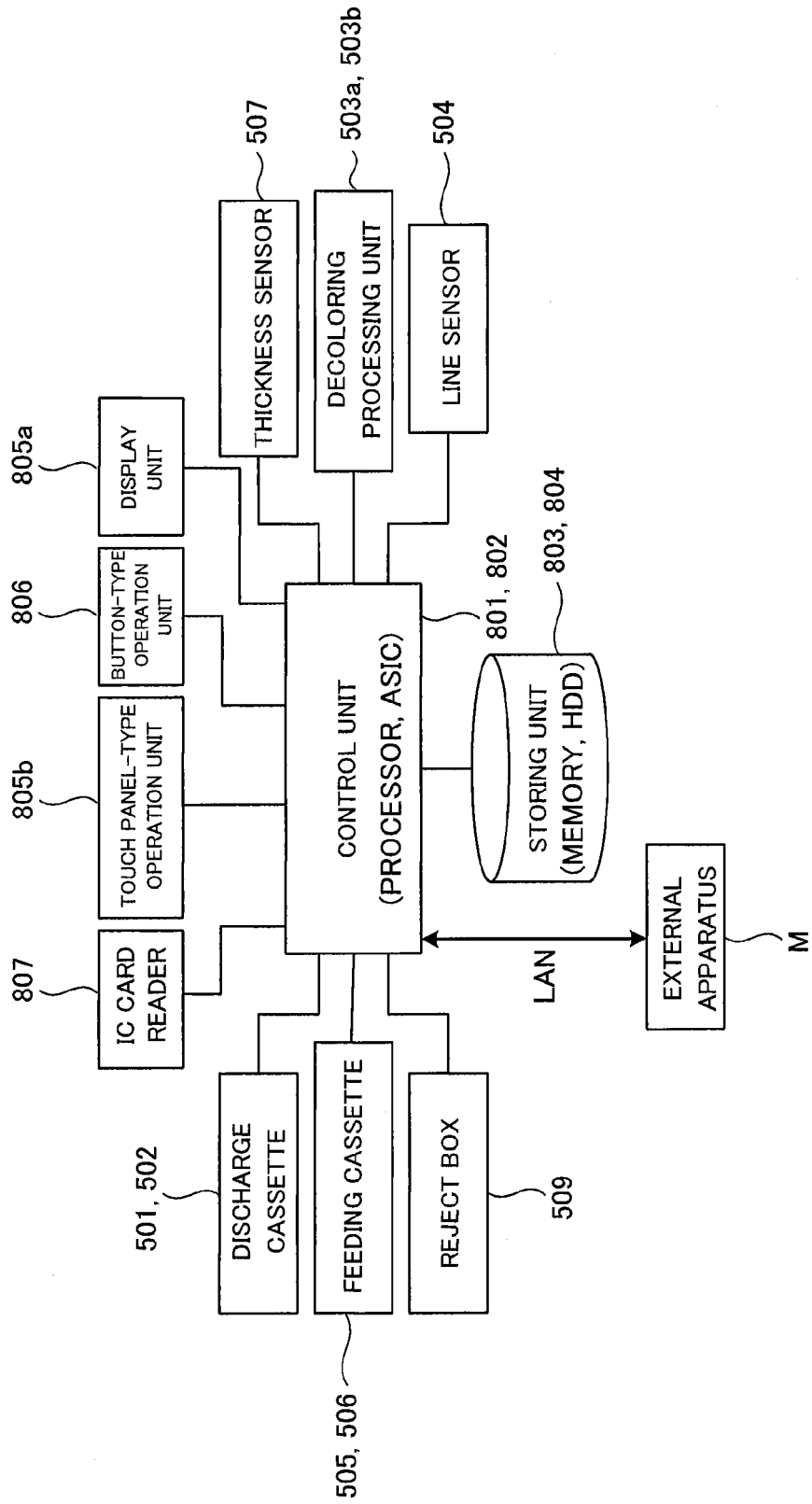
FIG. 4 is a block diagram of a functional configuration of the decoloring apparatus E according to the first embodiment.

FIG. 3 is a longitudinal sectional view of the internal configuration of the decoloring apparatus E according to the first embodiment. FIG. 4 is a block diagram of a functional configuration of the decoloring apparatus E according to the first embodiment.

The decoloring apparatus E includes, for example, the feeding cassettes 505 and 506 configured to stack and store sheets having images formed thereon to be subjected to decoloring processing, the discharge cassettes 501 and 502 configured to store the sheets subjected to the decoloring processing in the decoloring apparatus E, the reject box 509 (equivalent to a disposal sheet storing unit) configured to store un-reusable sheets, a lever-type thickness sensor 507 configured to detect the thickness of a conveyed sheet, double feed sensors 508 configured to detect double feed of sheets fed from the feeding cassettes 505 and 506, an optical line sensor 504 for detecting a printing state (including luminance, soil, stain, crease, and color) of the image formed on a surface of the conveyed sheet, decoloring processing units 503a and 503b configured to heat and decolor the image formed with an decolorable colorant on the sheet, conveying paths Pa to Pj and the like for leading a conveyance target sheet in a predetermined sheet conveying direction, conveying rollers R3 to R8 configured to convey the sheet through the conveying paths Pa to Pj and the like, sheet feeding rollers R1 and R2 configured to feed the sheets from the feeding cassettes 505 and 506 to the conveying paths, discharge rollers R9 and R10 configured to discharge sheets subjected to the decoloring processing to the discharge cassettes 501 and 502, and flappers F provided at branch points of the conveying paths.

The conveying paths Pa to Pj and the like and the conveying rollers R3 to R8 and the like are equivalent to a "sheet conveying unit". The conveying rollers R1 to R10 are controlled to be driven by the processor 801. A conveying direction of a sheet conveyed by the sheet conveying unit is regulated by the flappers F controlled by the processor 801.

The sheet conveying unit includes the conveying paths Pc, Pd, and Pe serving as a "disposal sheet conveying path" for conveying a sheet passed through the line sensor 504 (an image reading unit) in the sheet conveying direction to the reject box 509 configured to store un-reusable sheets.

The line sensor 504 and the processor 801 cooperate with each other to realize a function of the "image reading unit".

The line sensor 504 is arranged further on the upstream side in the sheet conveying direction than the decoloring processing units 503a and 503b and scans an image formed on the sheet conveyed by the sheet conveying unit. The processor 801 detects, on the basis of image data read from the sheet by the line sensor 504, a printing ratio, printing density, a printing color (equivalent to printing state information), and the like of the image formed on the sheet.

The line sensor 504 can read, concerning both sides of the sheet, the printing ratio, the printing density, the printing color, and the like as the "printing state information".

The thickness sensor 507 and the processor 801 cooperate with each other to realize a function of a "sheet-thickness detecting unit". The thickness sensor 507 is arranged further on the upstream side than the decoloring processing units 503a and 503b in the sheet conveying direction by the sheet conveying unit. The thickness sensor 507 includes a lever member 507L that can rotate with a rotating shaft 507r as a fulcrum. The lever member 507L is urged by an elastic member such as a spring in a counterclockwise direction in FIG. 2 with the rotating shaft 507r as a fulcrum. The thickness sensor 507 detects a rotation angle of the lever member 507L, which retracts according to the thickness of a sheet passing near the thickness sensor 507 in the sheet conveying path, with an optical sensor or the like and obtains information concerning the thickness of the sheet.

The processor 801 is equivalent to a "processing control unit".

The decoloring processing unit 503a includes rollers a1 and a2 and a belt a3 wound and suspended around the rollers. The belt a3 also rotates according to rotation of the rollers. At least one of the rollers a1 and a2 is driven to rotate by the processor 801. At least one of the rollers a1 and a2 is heated by a heater controlled by the processor 801.

Similarly, the decoloring processing unit 503b includes rollers b1 and b2 and a belt b3 wound and suspended around the rollers. The belt b3 also rotates according to rotation of the rollers. At least one of the rollers b1 and b2 is driven to rotate by the processor 801. At least one of the rollers b1 and b2 is heated by the heater controlled by the processor 801.

The decoloring processing units 503a and 503b having the configuration explained above heat a sheet nipped and conveyed by the belts a3 and b3, the conveying rollers R6 and R7, and the like while conveying the sheet to thereby decolor an image of an decolorable colorant formed on the sheet.

The processor 801 (the processing control unit) controls control parameters for the decoloring processing by the decoloring processing units 503a and 503b, sheet conveying speed by the sheet conveying unit, and the like on the basis of the acquired printing state information.

Further, the processor 801 conveys the sheet subjected to the decoloring processing to the line sensor 504 through the conveying path Pj and the conveying path Pg to thereby cause the line sensor 504 to read images on both sides of the sheet subjected to the decoloring processing.

A basic operation of processing in the decoloring apparatus E according to the first embodiment is explained below.

The processor 801 controls the sheet feeding roller R1 or R2 to feed a sheet Sb to be subjected to the decoloring processing from the cassette 505 or 506 to the sheet conveying path.

The double feed sensors 508 perform double feed detection of sheets fed from the cassettes 505 and 506.

If double feed is detected by any of the double feed sensors 508, the processor 801 drives the conveying roller R3 or R4 to discharge the sheets, the double feed of which is detected, to the reject box 509 through the conveying path Pc or Pd.

Subsequently, the processor 801 acquires information by detecting, using the thickness sensor 507, the thickness of one sheet fed without being doubly fed.

If the sheet thickness detected by the thickness sensor 507 exceeds a predetermined threshold, the processor 801 discharges the sheet to the reject box 509 through the conveying paths Pb, Ph, and Pe.

The conveying path Pb is provided further on the upstream side than the line sensor 504 in the sheet conveying direction. This makes it possible to prevent a sheet having thickness exceeding a tolerance in the line sensor 504 from entering the line sensor 504. Therefore, it is possible to prevent occurrence of deficiencies such as a sheet jam and breakage in the line sensor 504.

If sheets are not doubly fed and the sheet thickness does not exceed the predetermined threshold, the processor 801 causes the line sensor 504 to read images on both sides of the sheet.

The processor 801 controls the conveying rollers R6, R7, R5, and the like to discharge a sheet having a "printing ratio" or "printing density", which is detected based on the images read by the line sensor 504, exceeding a predetermined threshold to the reject box 509 through the conveying paths Pi, Pj, and Pe.

The processor 801 (the processing control unit) controls, on the basis of information acquired from the line sensor 504, the thickness sensor 507, and the like, control parameters of the decoloring processing performed by the decoloring processing units 503a and 503b and the sheet conveying unit in cooperation with each other.

The processor 801 executes, on the basis of the control parameters set to correspond to a sheet to be subjected to the decoloring processing as explained above, the decoloring processing performed by the conveying rollers R6 and R7, the decoloring processing units 503a and 503b, and the like in cooperation with one another on the sheet.

The processor 801 conveys the sheet subjected to the decoloring processing to the line sensor 504 through the conveying paths Pj and Pg to thereby read images on both sides of the sheet subjected to the decoloring processing.

As a result of the image reading, if it is determined that a color of a colorant remains on the sheet at density equal to or larger than a predetermined value, the processor 801 determines how many times the decoloring processing is already repeated for the sheet. If the decoloring processing is repeated the number of times equal to or larger than a predefined number of times, the processor 801 determines that it is difficult to decolor the colorant and causes the sheet conveying unit to discharge the sheet to the reject box 509 through the conveying paths Pi, Pj, and Pe. History information concerning how many times the decoloring processing is applied to a certain sheet can be stored in, for example, the memory 803 or the HDD 804.

On the other hand, if the decoloring processing is not repeated the number of times equal to or larger than the predefined number of times, the processor 801 executes the decoloring processing again.

The processor 801 reads the images on both the sides of the sheet subjected to the decoloring processing with the line sensor 504. If it is determined that the colorant having density equal to or larger than the predetermined value does not remain on the sheet, the processor 801 causes the sheet conveying unit to discharge the sheet to the discharge cassette 501 or 502 through the conveying paths Pi, Pj, and Pf.

The processor 801 and the ASIC 802 accumulate logs of various kinds of processing performed in the decoloring apparatus E in the HDD 804 as a data table. Further, in order to perform dynamic display processing involved in the execution of the decoloring processing, the processor 801 and the ASIC 802 perform processing for data addition to the data table on a real time basis every time data that should be added is generated. The processor 801 and the ASIC 802 always refer to the dynamically-updated data table to thereby dynamically update display contents (e.g., data contents of the data table) on the display unit 805a.

FIGS. 5 to 7 are diagrams of examples of the data table of the logs of the various kinds of processing accumulated in the HDD 804.

First, the processor 801 and the ASIC 802 register information of items (1) to (6) below in association with an decoloring processing ID issued for each kind of decoloring processing when the decoloring processing is performed in the decoloring apparatus E (see FIG. 5).
(1) Processing execution day (a day when the decoloring processing is executed)
(2) User ID (an ID of a user who instructs execution of the decoloring processing)
(3) Department (a department to which the user having the ID belongs)
(4) Number of decoloring processing executed sheets (the number of sheets subjected to the decoloring processing having the processing ID (on which execution of the decoloring processing is attempted))
(5) Number of decoloring processing successful sheets (the number of sheets for which the decoloring processing having the processing ID is successful)
(6) Number of decoloring processing unsuccessful sheets (the number of sheets for which the decoloring processing having the processing ID is unsuccessful)

Further, the processor 801 and the ASIC 802 register information of items (7) to (10) below in association with the decoloring processing ID issued for each kind of decoloring processing when the decoloring processing is performed in the decoloring apparatus E (see FIG. 6).
(7) Total number of decoloring unsuccessful sheets (a total number of sheets for which the decoloring processing having the processing ID is unsuccessful)
(8) Reuse ratio [%] (a ratio of the number of sheets for which the decoloring processing having the processing ID is successful to the number of sheets on which the decoloring processing is executed (=((5)/(4))×100))
(9) Improvement content guidance ID (an ID indicating guidance contents desired to be presented to the user on the basis of a result of the decoloring processing having the processing ID)
(10) Environmental load contribution ratio (a numerical value obtained by multiplying the number of decoloring processing successful sheets with a predetermined coefficient)

Moreover, the processor 801 and the ASIC 802 register each of predetermined periods and information of items (11) to (13) below concerning processing contents of respective kinds of decoloring processing executed in the periods in association with each other when the decoloring processing is performed in the decoloring apparatus E (see FIG. 7).
(11) Number of in-period printed sheets (the number of sheets on which the print processing is executed in the period in a specific image forming apparatus (e.g., an image forming apparatus with which the decoloring apparatus E can communicate) set in advance)
(12) Number of in-period decoloring processing executed sheets (the number of sheets on which the decoloring processing is executed (the decoloring processing is attempted) in the decoloring apparatus E in the period)
(13) Number of in-period decoloring processing successful sheets (the number of sheets for which the decoloring processing executed by the decoloring apparatus E is successful in the period)

The processor 801 and the ASIC 802 can sort or process each data of the data table, which is stored in the HDD 804, in a desired array or arrangement order and use the data. For example, the processor 801 and the ASIC 802 can generate the data of (7) to (13) by processing or totalizing the data of (1) to (6).

Figure 8:
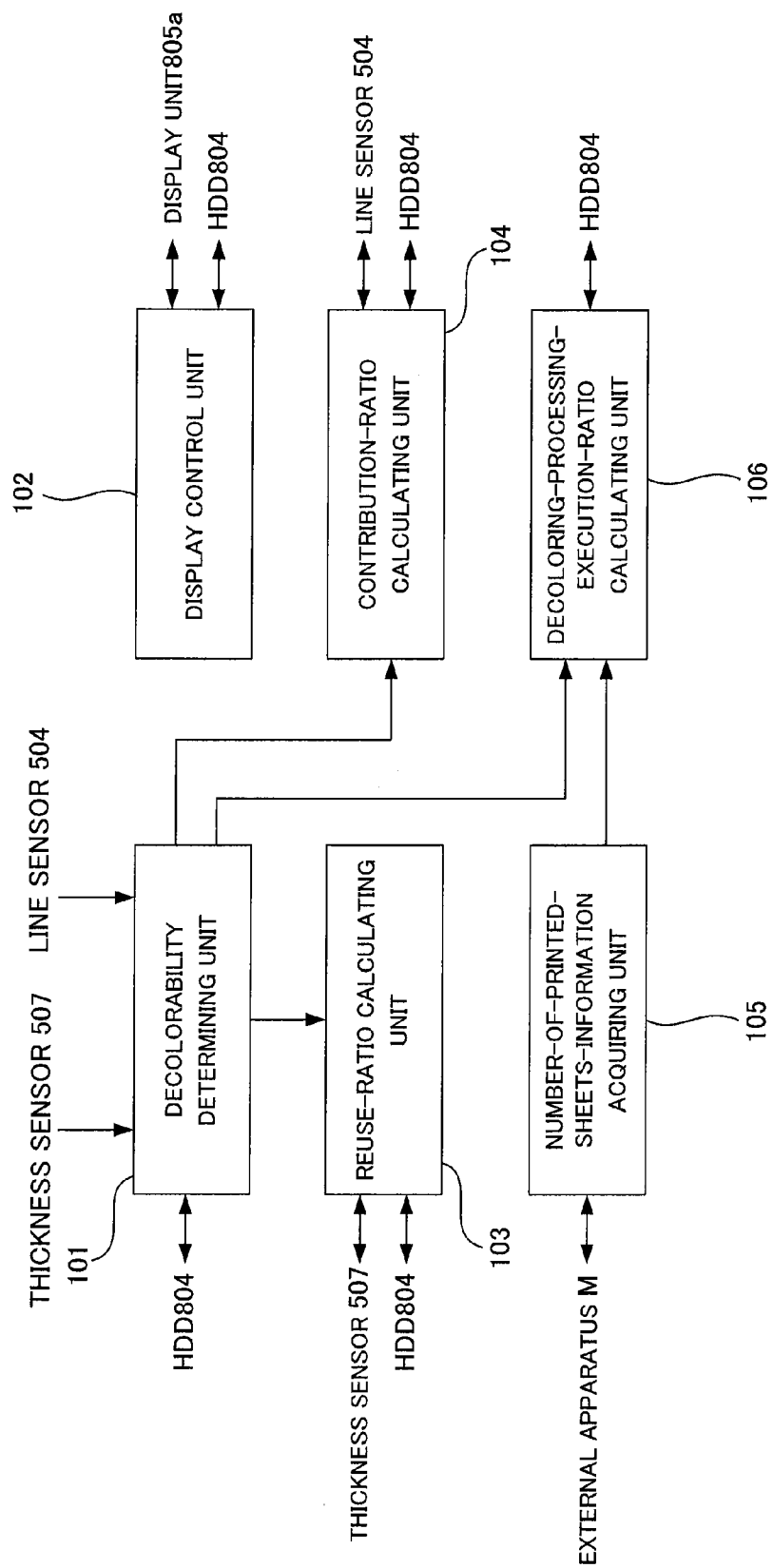
FIG. 8 is a functional block diagram for explaining the decoloring apparatus E according to the first embodiment.

FIG. 8 is a functional block diagram for explaining the decoloring apparatus E according to the first embodiment.

The decoloring apparatus E according to the first embodiment includes an decolorability determining unit 101, a display control unit 102, a reuse-ratio calculating unit 103, a contribution-ratio calculating unit 104, a number-of-printed-sheets-information acquiring unit 105, and an decoloring processing-execution-ratio calculating unit 106.

The decolorability determining unit 101 determines, on the basis of a detection result in at least one of the line sensor 504 (the image reading unit) and the thickness sensor 507, executability of the decoloring processing in the decoloring processing units 503a and 503b for a sheet set as the detection target.

If the sheet set as the detection target is a "sheet on which the decoloring processing in the decoloring processing units cannot be executed", the decolorability determining unit 101 determines, on the basis of the detection result in at least one of the line sensor 504 and the thickness sensor 507, to which of plural predetermined results a reason for unexecutability of the decoloring processing corresponds.

In this embodiment, several reference values for "reasons for unexecutability of the decoloring processing" are stored in advance in a storage area such as the HDD 804. If any one of the reference values is exceeded, the decolorability determining unit 101 determines a reason corresponding to the reference value as a "reason for unexecutability of the decoloring processing".

Specific examples of the "reasons for unexecutability of the decoloring processing (unreusability)" include the following:
(1) an undecolored image remains on a sheet (e.g., the image is drawn by an undecolorable pen such as a ballpoint pen);
(2) there is a bend or a tear in a sheet;
(3) sheets are bundled (e.g., a sheet bundle is stapled); and
(4) an object is left on a sheet (e.g., a tag is attached to the sheet).

The display control unit 102 causes the display unit 805a to screen-display information stored in the memory 803 or the HDD 804 indicating the number of sheets determined as "decoloring processing unexecutable" by the decolorability determining unit 101.

If the display control unit 102 receives, in the touch panel-type operation unit 805b, a display request for a totalization result of "information indicating the number of sheets determined as decoloring processing unexecutable by the decolorability determining unit 101" stored in the memory 803 or the HDD 804 based on information concerning at least one of an "execution day of the decoloring processing" and "identification information of a user who instructs execution of the decoloring processing", the display control unit 102 causes the display unit 805a to screen-display the totalization result.

The reuse-ratio calculating unit 103 calculates "information indicating a reuse ratio of a sheet" on the basis of (1) the number of sheets determined as decoloring processing unexecutable by the decolorability determining unit 101 and (2) the number of sheets set as the detection targets by the thickness sensor 507.

The display control unit 102 causes the display unit 805a to screen-display the "information indicating a reuse ratio of a sheet".

The display control unit 102 causes, on the basis of a determination result in the decolorability determining unit 101, the display unit 805a to screen-display the "number of sheets determined as decoloring processing unexecutable because of each of plural reasons for unexecutability of the decoloring processing" in association with "each of the plural reasons for unexecutability of the decoloring processing".

The display control unit 102 causes the display unit 805a to screen-display a "predetermined advice content for improving a state of unexecutability of the decoloring processing based on the reason" in association with a "reason for unexecutability of the decoloring processing" determined by the decolorability determining unit 101.

Further, the display control unit 102 causes, on the basis of the determination result in the decolorability determining unit 101, the display unit 805a to screen-display the "number of sheets determined as decoloring processing unexecutable because of each of plural reasons for unexecutability of the decoloring processing" in association with "each of the plural reasons for unexecutability of the decoloring processing" and causes the display unit 805a to screen-display a predetermined advice content for improving a state of unexecutability of the decoloring processing due to a reason that the number of sheets determined as decoloring processing unexecutable is the largest.

The contribution-ratio calculating unit 104 calculates the "number of sheets actually subjected to the decoloring processing" on the basis of the number of sheets determined as "decoloring processing unexecutable" by the decolorability determining unit 101 and the number of sheets set as the detection targets by the thickness sensor 507 and calculates an "environmental load contribution ratio (e.g., a reduction amount of $CO_2$)" calculated by multiplying the number of sheets subjected to the decoloring processing with a specified coefficient.

The display control unit 102 causes the display unit 805a to screen-display the "environmental load contribution ratio" calculated by the contribution-ratio calculating unit 104.

The number-of-printed-sheets-information acquiring unit 105 acquires "information indicating the number of sheets subjected to print processing in an image forming apparatus that can communicate with the decoloring apparatus E".

The decoloring processing-execution-ratio calculating unit 106 calculates an "decoloring processing execution ratio" that is a ratio of the number of sheets subjected to the decoloring processing, which is calculated on the basis of the number of sheets determined as "decoloring processing unexecutable" by the decolorability determining unit 101 and the number of sheets set as the detection targets by the thickness sensor, to the number of sheets acquired by the number-of-printed-sheets-information acquiring unit 105.

The display control unit 102 causes the display unit 805a to screen-display the "decoloring processing execution ratio".

Figure 9:
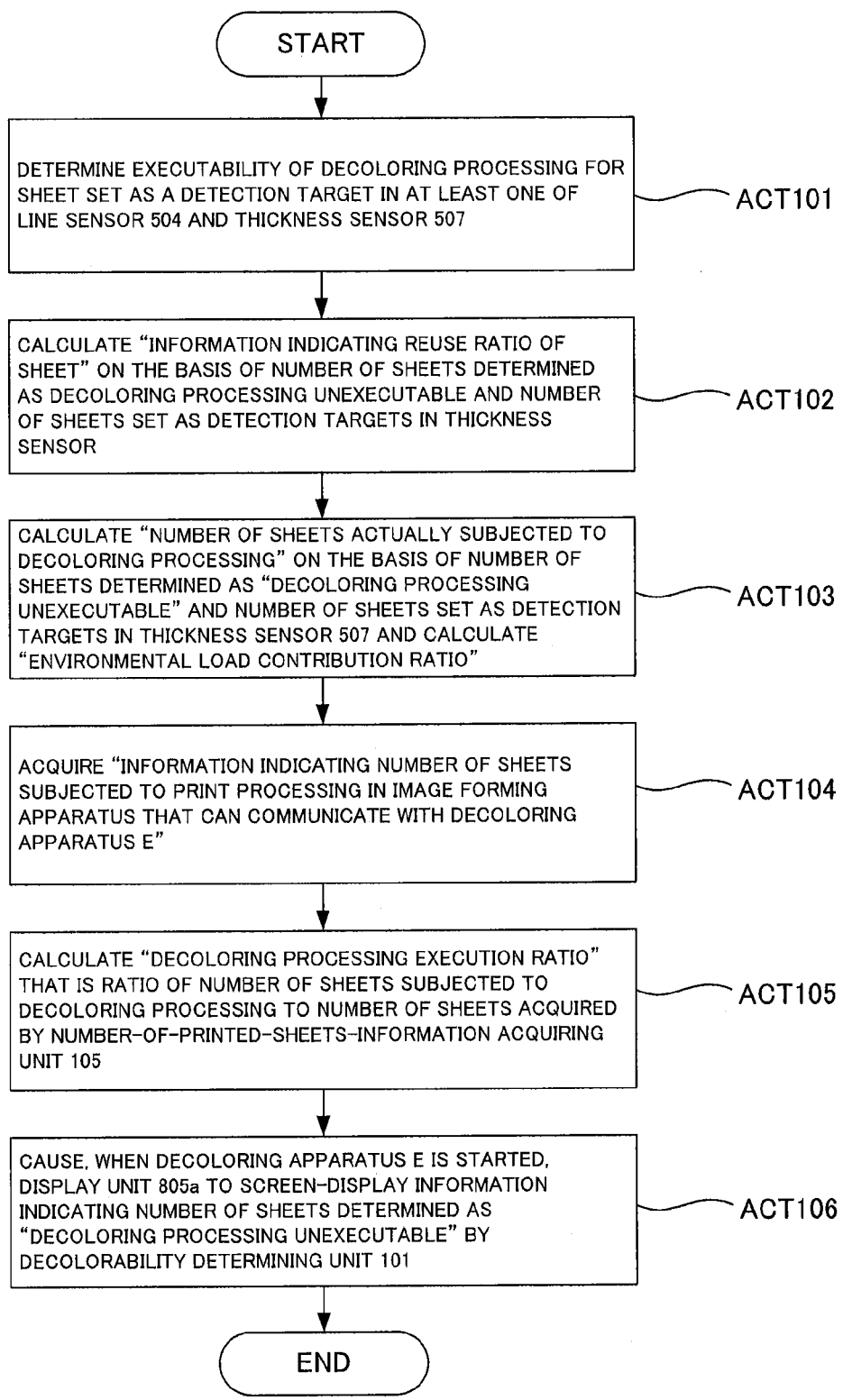
FIG. 9 is a flowchart for explaining a flow of processing (a display control method) in the decoloring apparatus E according to the first embodiment.

FIG. 9 is a flowchart for explaining a flow of processing (a display control method) in the decoloring apparatus E according to the first embodiment. FIGS. 10 to 16 are diagrams of examples of display contents on an interface screen in the decoloring apparatus E according to the first embodiment.

The decolorability determining unit 101 determines decolorability of the decoloring processing in the decoloring processing units 503a and 503b of a sheet set as the detection target in at least one of the line sensor 504 and the thickness sensor 507 (ACT 101).

The reuse-ratio calculating unit 103 calculates "information indicating a reuse ratio of a sheet" on the basis of (1) the number of sheets determined as decoloring processing unexecutable by the decolorability determining unit 101 and (2) the number of sheets set as the detection targets by the thickness sensor 507 (ACT 102).

The contribution-ratio calculating unit 104 calculates the "number of sheets actually subjected to the decoloring processing" on the basis of the number of sheets determined as "decoloring processing unexecutable" and the number of sheets set as the detection targets by the thickness sensor 507 and calculates an "environmental load contribution ratio" calculated by multiplying the number of sheets subjected to the decoloring processing with a specified coefficient (ACT 103).

The number-of-printed-sheets-information acquiring unit 105 acquires "information indicating the number of sheets subjected to the print processing in an image forming apparatus that can communicate with the decoloring apparatus E" (ACT 104).

The decoloring processing-execution ratio calculating unit 106 calculates an "decoloring processing execution ratio" that is a ratio of the number of sheets subjected to the decoloring processing, which is calculated on the basis of the number of sheets determined as "decoloring processing unexecutable" by the decolorability determining unit 101 and the number of sheets set as the detection targets by the thickness sensor 507, to the number of sheets acquired by the number-of-printed-sheets-information acquiring unit 105 (ACT 105).

The display control unit 102 causes the display unit 805a to screen-display information stored in the memory 803 or the HDD 804 indicating the number of sheets determined as "decoloring processing unexecutable" by the decolorability determining unit 101 (ACT 106).

The display control unit 102 causes the display unit 805a to screen-display "information indicating a reuse ratio of a sheet".

The display control unit 102 causes, on the basis of a determination result in the decolorability determining unit 101, the display unit 805a to screen-display the "number of sheets determined as decoloring processing unexecutable because of each of plural reasons for unexecutability of the decoloring processing" in association with "each of the plural reasons for unexecutability of the decoloring processing".

The display control unit 102 causes the display unit 805a to screen-display, in association with a "reason for unexecutability of the decoloring processing" determined by the decolorability determining unit 101, a "predetermined advice content for improving a state of unexecutability of the decoloring processing based on the reason".

The display control unit 102 causes the display unit 805a to screen-display the "environmental load contribution ratio" calculated by the contribution-ratio calculating unit 104.

The display control unit 102 causes the display unit 805a to screen-display the "decoloring processing execution ratio".

Figure 10:
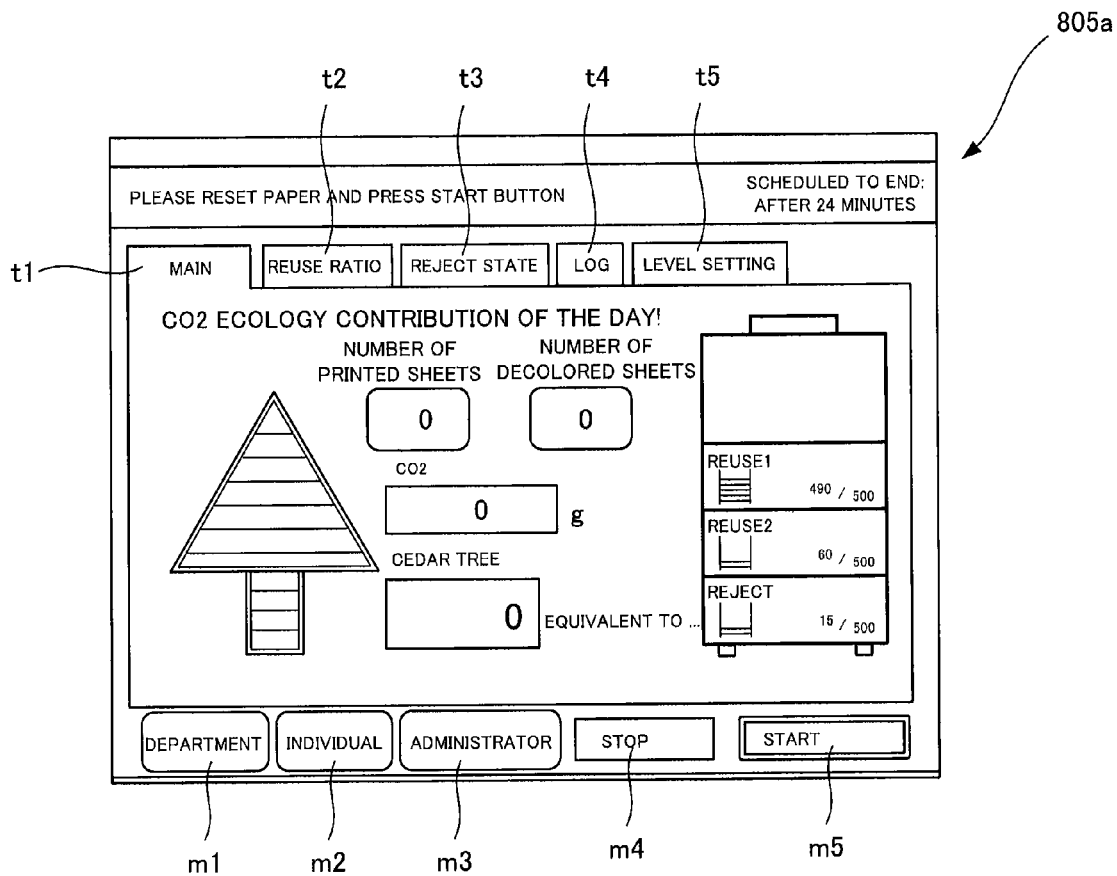
FIG. 10 is a diagram of an example of display contents on an interface screen in the decoloring apparatus E according to the first embodiment.

FIG. 10 is a diagram of an example of a main menu screen displayed on the display unit 805a by the display control unit 102.

On the main menu screen, an arbitrary sheet can be selected by tabs t1 to t5.

Figure 11:
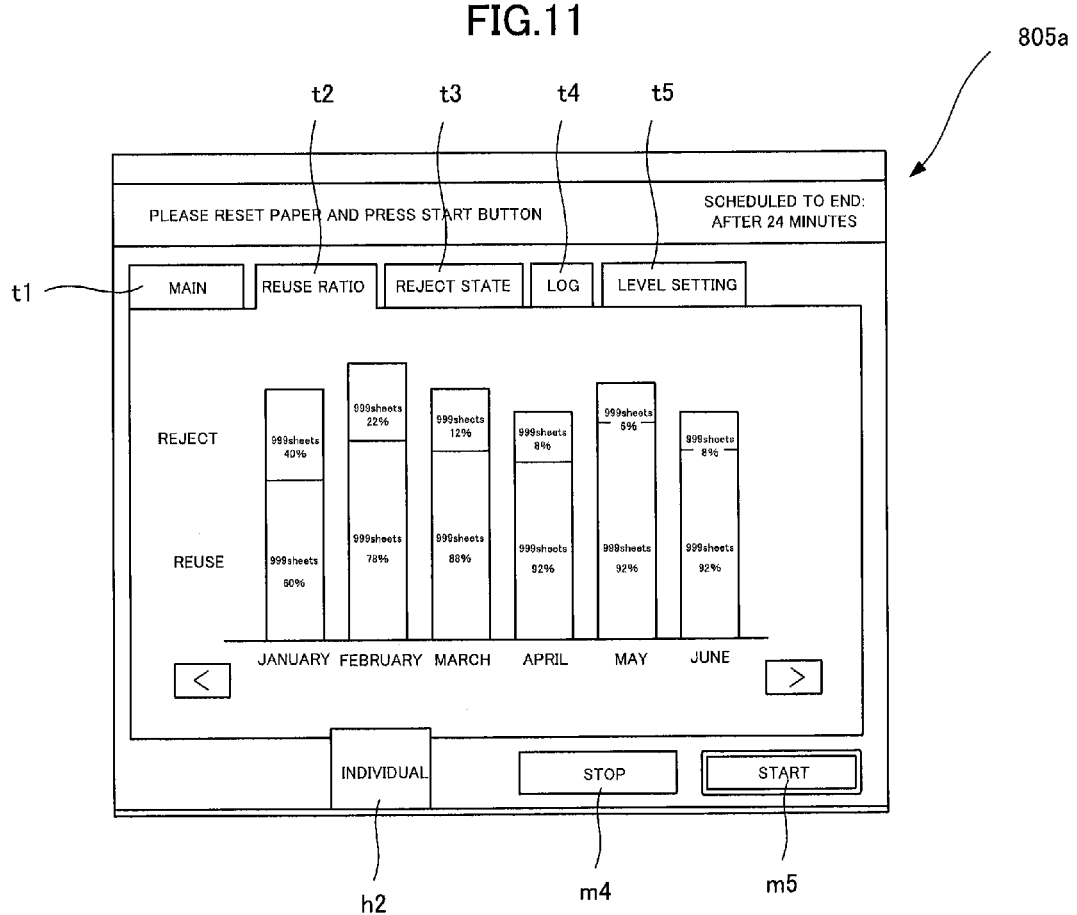
FIG. 11 is a diagram of an example of display contents on the interface screen in the decoloring apparatus E according to the first embodiment.
Figure 12:
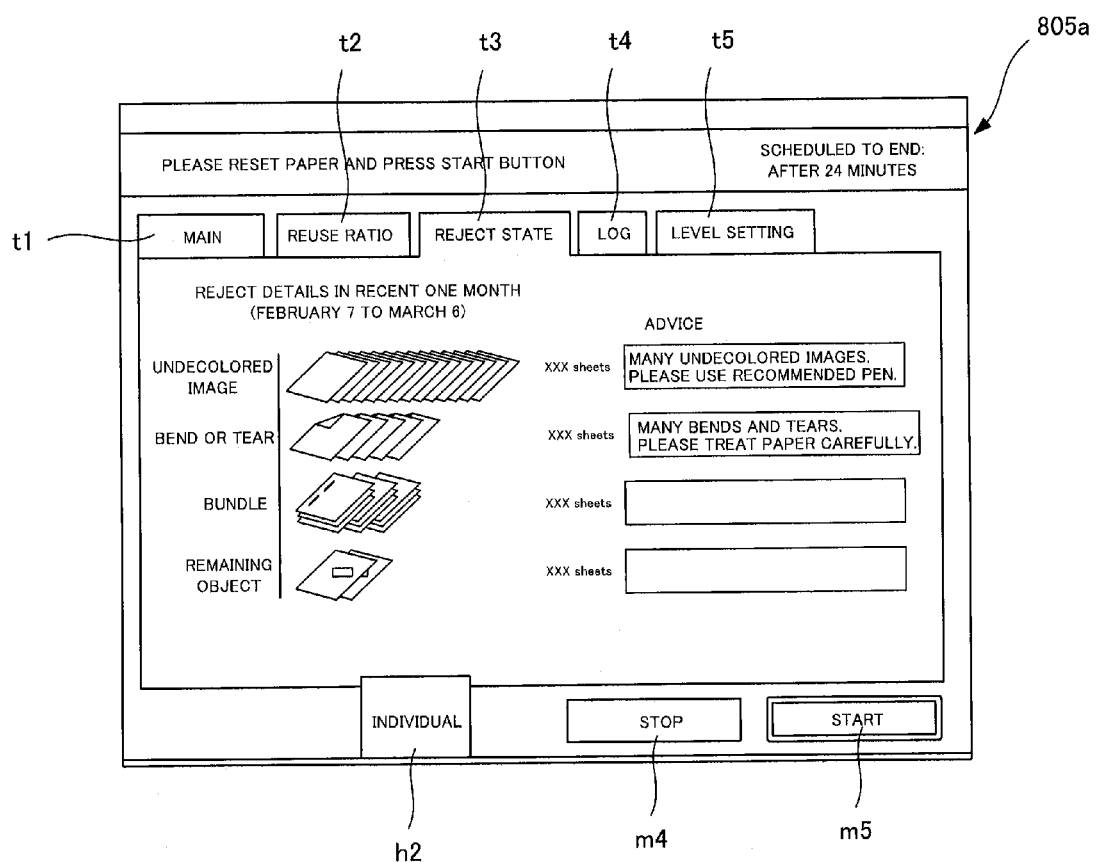
FIG. 12 is a diagram of an example of display contents on the interface screen in the decoloring apparatus E according to the first embodiment.
Figure 13:
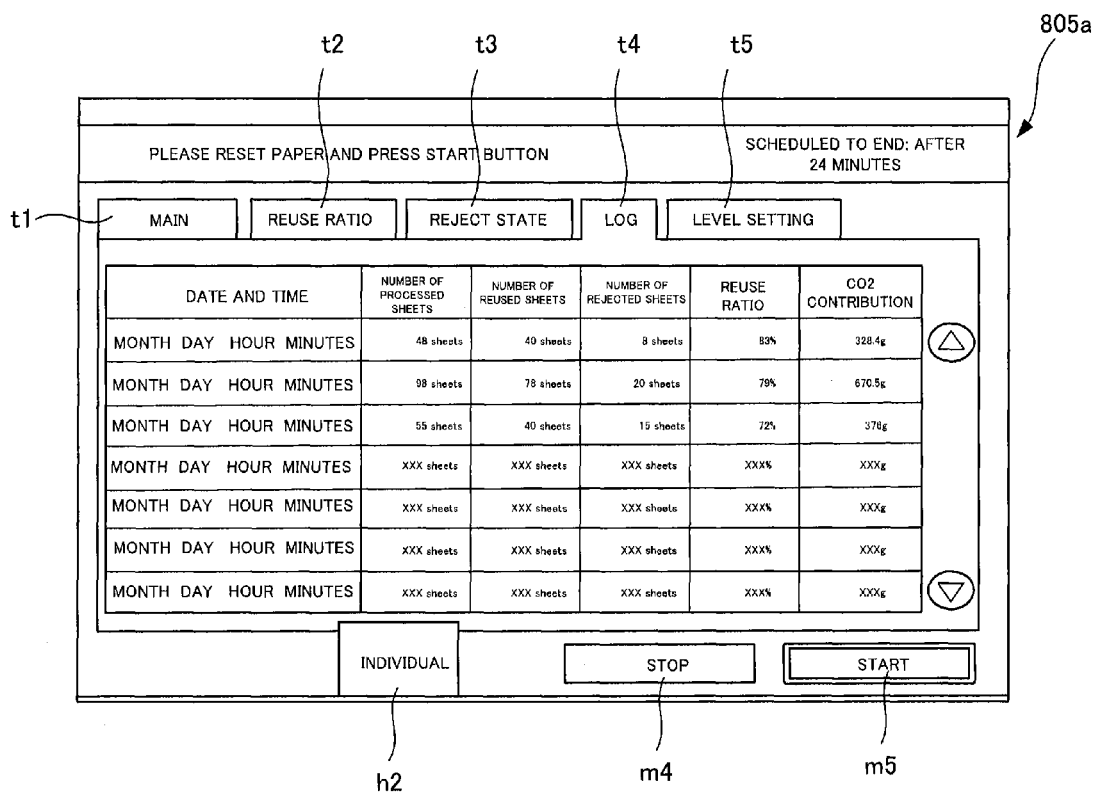
FIG. 13 is a diagram of an example of display contents on the interface screen in the decoloring apparatus E according to the first embodiment.
Figure 14:
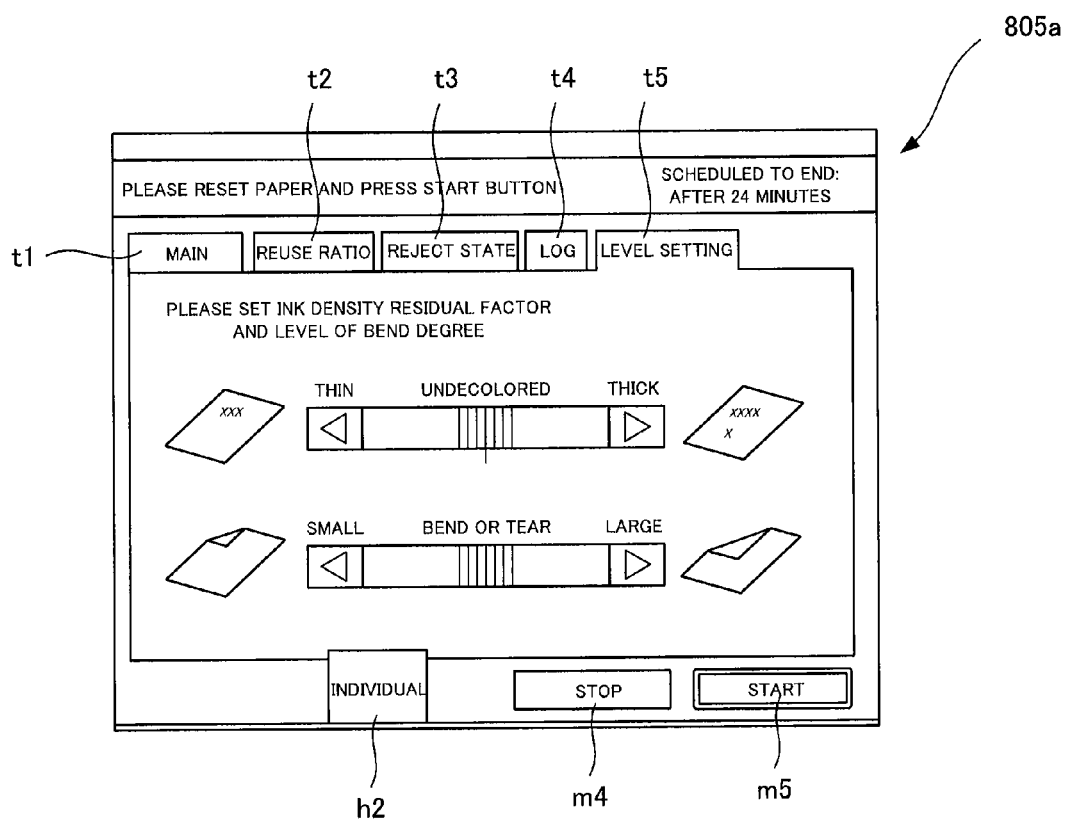
FIG. 14 is a diagram of an example of display contents on the interface screen in the decoloring apparatus E according to the first embodiment.

In FIG. 10, a state in which the tab t1 is selected and a main menu display screen is displayed is shown. In FIG. 11, a state in which the tab t2 is selected and a reuse ratio display screen is displayed is shown. In FIG. 12, a state in which the tab t3 is selected and a reject state display screen is displayed is shown. In FIG. 13, a state in which the tab t4 is selected and a log display screen (on which information such as a $CO_2$ reduction amount and a reuse ratio is displayed) is displayed is shown. In FIG. 14, a state in which the tab t5 is selected and a level setting display screen is displayed is shown.

On the main menu screen shown in FIG. 10, a department button m1, an individual button m2, an administrator button m3, a stop button m4, and a start button m5 are displayed on a lower side of the screen.

When the user causes the IC card reader 807 to read an IC card in which ID information of the user is stored and performs personal authentication, the user can view, by pressing the individual button m2, a totalization result of information concerning a processing result of decoloring processing (based on information stored in the HDD 804 in association with the ID information of the user) that the user causes the decoloring apparatus E to perform.

When the user causes the IC card reader 807 to read the IC card in which the ID information of the user is stored, performs personal authentication, and then presses the department button m1, the user can view a totalization result concerning decoloring processing based on information associated with a department to which the user belongs.

In FIGS. 11 to 14, screen display examples displayed when the tabs t2 to t5 are respectively selected in a state in which the user, who performs the personal authentication, presses the individual button m2 are shown.

Figure 15:
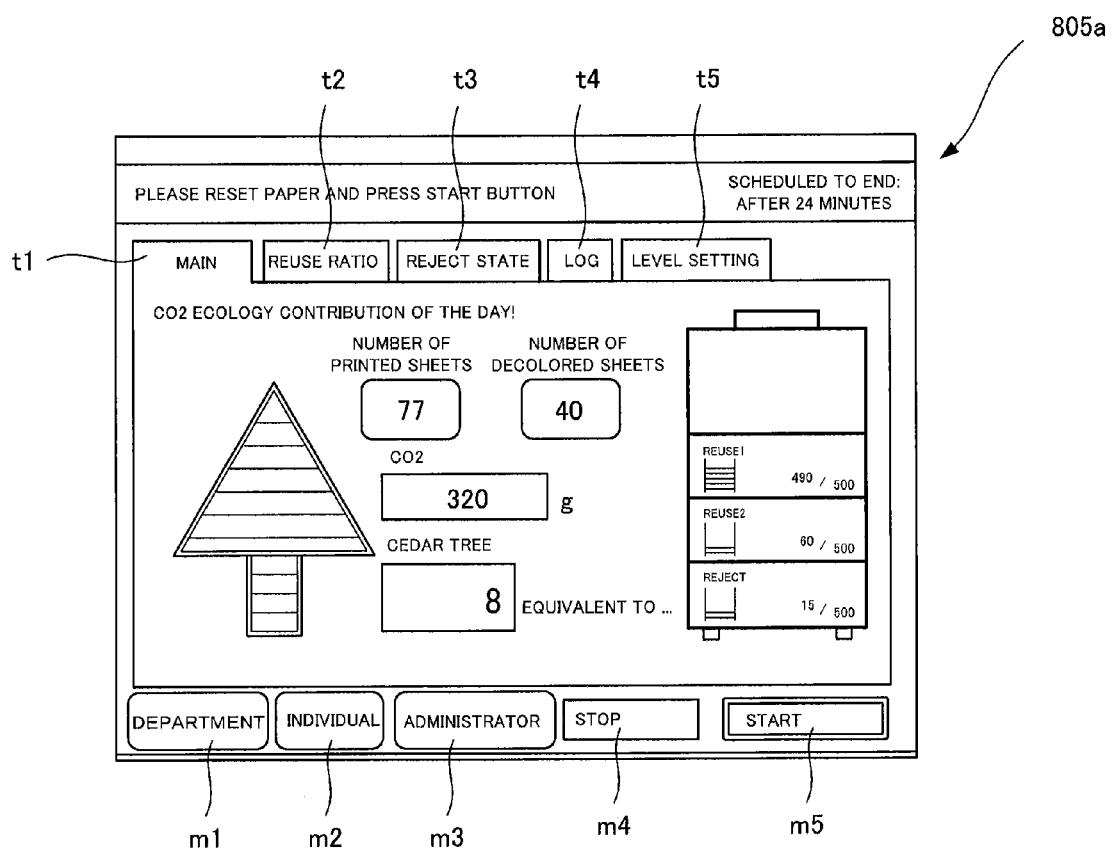
FIG. 15 is a diagram of an example of display contents on the interface screen in the decoloring apparatus E according to the first embodiment.

FIG. 15 is a diagram of a screen display example on the display unit 805a in a state in which the user presses the start button m5 and the decoloring processing in the decoloring apparatus E is started.

As shown in FIG. 15, values of the "number of printed sheets", the "number of sheets subjected to the decoloring processing in the decoloring apparatus E", a "$CO_2$ amount reduced by the execution of the decoloring processing", and the "number of cedar trees indicating contribution to the environment by the execution of the decoloring processing", which are zero before the start of the decoloring processing, are updated and displayed on a real time basis according to the start of the decoloring processing.

Figure 16:
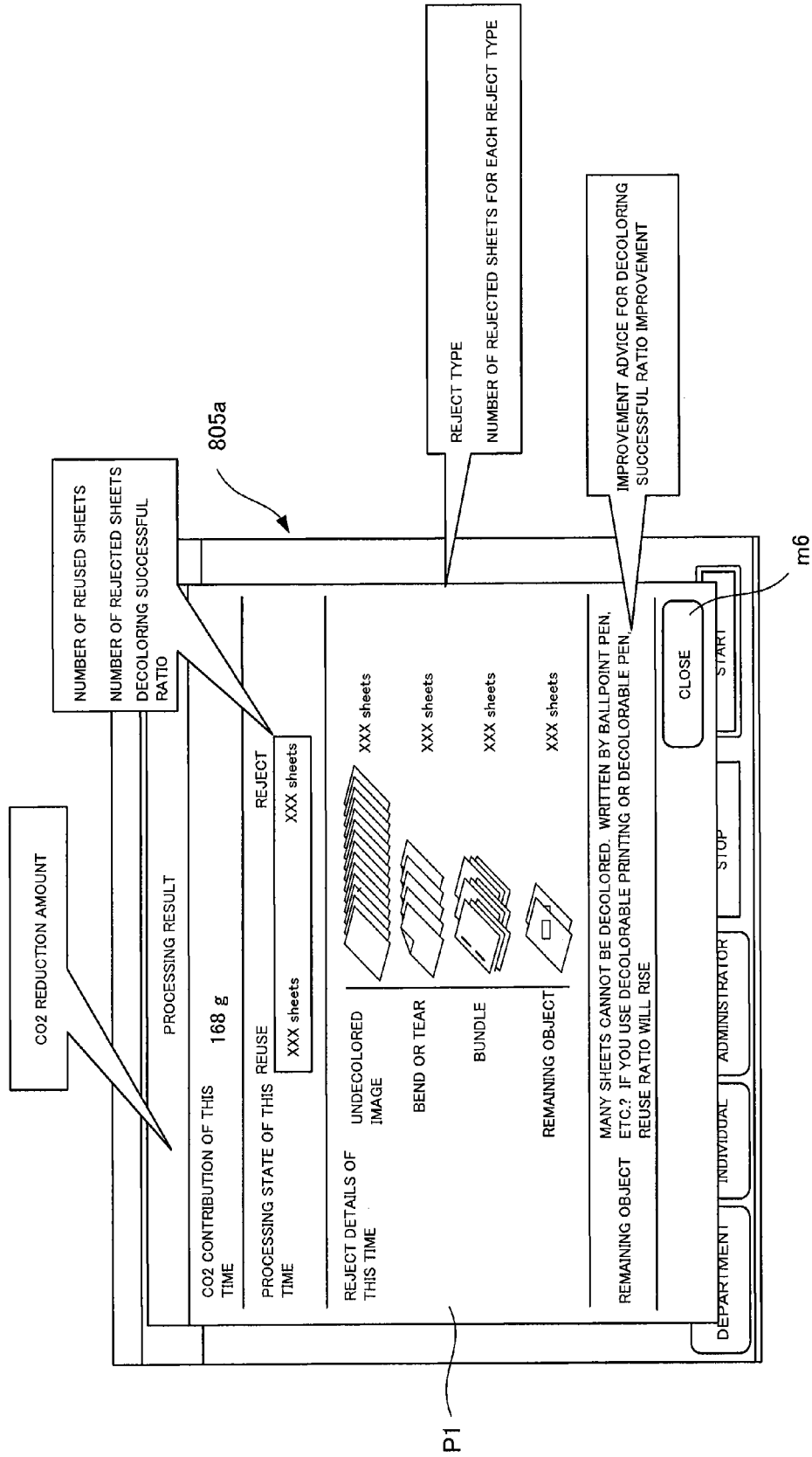
FIG. 16 is a diagram of an example of display contents on the interface screen in the decoloring apparatus E according to the first embodiment.

FIG. 16 is a diagram of a screen display example on the display unit 805a at the time when the decoloring processing in the decoloring apparatus E is completed.

As shown in FIG. 16, the display control unit 102 causes, on the basis of a determination result in the decolorability determining unit 101, the display unit 805a to classify and display the "number of sheets determined as decoloring processing unexecutable because of each of plural reasons for unexecutability of the decoloring processing" in association with "each of the plural reasons for unexecutability of the decoloring processing".

The display control unit 102 causes the display unit 805a to screen-display a predetermined improvement advice for improving a state of unexecutability of the decoloring processing due to a reason that the number of sheets determined as decoloring processing unexecutable is the largest.

The operations in the processing in the decoloring apparatus E are realized by causing the processor 801 to execute a computer program stored in the memory 803.

As explained above, in the first embodiment, when the main menu screen is displayed on the display unit 805a, the user presses any one of the department button m1, the individual button m2, and the administrator button m3, whereby an interface screen on which data totalized in each of the units can be viewed is displayed.

By adopting such a configuration, the user can easily grasp a state of decoloring processing performed by the user and a state of decoloring processing in a department to which the user belongs. As a result, it is possible to improve awareness of the user concerning paper reuse and improve promotion of reuse of paper.

Further, according to the first embodiment, for example, it is possible to provide an decoloring apparatus having a configuration explained below.

(1). An decoloring apparatus including:

an decoloring processing unit configured to subject a sheet on which an image is formed with an decolorable colorant to decoloring processing decoloring a color of the decolorable colorant;

a sheet conveying unit configured to convey the sheet and cause the sheet to pass through the decoloring processing unit;

an image reading unit arranged further on an upstream side than the decoloring processing unit in a sheet conveying direction by the sheet conveying unit and configured to read the image formed on the sheet conveyed by the sheet conveying unit;

a thickness sensor arranged further on the upstream side than the decoloring processing unit in the sheet conveying direction by the sheet conveying unit and configured to detect the thickness of the sheet conveyed by the sheet conveying unit;

an decolorability determining unit configured to determine, on the basis of a detection result in at least one of the image reading unit and the thickness sensor, executability of the decoloring processing in the decoloring processing unit of the sheet set as a detection target;

a storing unit configured to store information indicating the number of sheets determined as decoloring processing unexecutable by the decolorability determining unit;

a display; and a display control unit configured to cause the display to screen-display the information stored in the storing unit indicating the number of sheets determined as decoloring processing unexecutable by the decolorability determining unit.

(2). The apparatus of (1), wherein the storing unit stores at least one of an execution day of the decoloring processing and identification information of a user who instructs an execution of the decoloring processing and the information indicating the number of sheets determined as decoloring processing unexecutable by the decolorability determining unit in association with each other, the apparatus further includes an operation input unit configured to receive an operation input of the user, and if the display control unit receives, in the operation input unit, a display request for a totalization result of the information stored in the storing unit indicating the number of sheets determined as decoloring processing unexecutable by the decolorability determining unit, which is based on information concerning at least one of the execution day of the decoloring processing and the identification information of the user who instructs the execution of the decoloring processing, the display control unit causes the display to screen-display the totalization result.

(3). The apparatus of (1), further including a reuse-ratio calculating unit configured to calculate information indicating a reuse ratio of the sheet on the basis of the number of sheets determined as decoloring processing unexecutable by the decolorability determining unit and the number of sheets set as the detection targets by the thickness sensor, wherein the display control unit causes the display to screen-display the information indicating the reuse ratio of the sheet.

(4). The apparatus of (1), wherein, if the sheet set as the detection target is a sheet on which the decoloring processing in the decoloring processing unit cannot be executed, the decolorability determining unit determines, on the basis of the detection result in at least one of the image reading unit and the thickness sensor, to which of plural predetermined reasons a reason for unexecutability of the decoloring processing corresponds.

(5). The apparatus of (4), wherein the display control unit causes, on the basis of a determination result in the decolorability determining unit, the display to screen-display the number of sheets determined as decoloring processing unexecutable because of each of the plural reasons for unexecutability of the decoloring processing in association with each of the plural reasons for unexecutability of the decoloring processing.

(6). The apparatus of (4), wherein the display control unit causes the display to screen-display, in association with the reason for decoloring processing unexecutability determined by the decolorability determining unit, a predetermined advice content for improving a state of unexecutability of the decoloring processing based on the reason.

(7). The apparatus of (4), wherein the display control unit causes, on the basis of a determination result in the decolorability determining unit, the display to screen-display the number of sheets determined as decoloring processing unexecutable because of each of the plural reasons for unexecutability of the decoloring processing in association with each of the plural reasons for unexecutability of the decoloring processing and causes the display to screen-display a predetermined advice content for improving a state of unexecutability of the decoloring processing due to a reason that the number of sheets determined as decoloring processing unexecutable is the largest.

(8). The apparatus of (1), further including a contribution-ratio calculating unit configured to calculate the number of sheets subjected to the decoloring processing on the basis of the number of sheets determined as decoloring processing unexecutable by the decolorability determining unit and the number of sheets set as the detection targets by the thickness sensor and calculate an environmental load contribution ratio calculated by multiplying the number of sheets subjected to the decoloring processing with a specified coefficient, wherein the display control unit causes the display to screen-display the environmental load contribution ratio calculated by the contribution-ratio calculating unit.

(9). The apparatus of (8), wherein the environmental load contribution ratio is a reduction amount of $CO_2$.

(10). The apparatus of (1), further including:

a number-of-printed-sheets-information acquiring unit configured to acquire information indicating the number of sheets subjected to print processing in an image forming apparatus that can communicate with the decoloring apparatus; and an decoloring processing-execution-ratio calculating unit configured to calculate an decoloring processing execution ratio that is a ratio of the number of sheets subjected to the decoloring processing, which is calculated on the basis of the number of sheets determined as decoloring processing unexecutable by the decolorability determining unit and the number of sheets set as the detection targets by the thickness sensor, to the number of sheets acquired by the number-of-printed-sheets-information acquiring unit, wherein the display control unit causes the display to screen-display the decoloring processing execution ratio.

Second Embodiment

A second embodiment is explained below.

The second embodiment is a modification of the first embodiment explained above. Therefore, components having functions same as those of the components already explained in the first embodiment are denoted by the same reference numerals and signs and explanation of the components is omitted.

Figure 17:
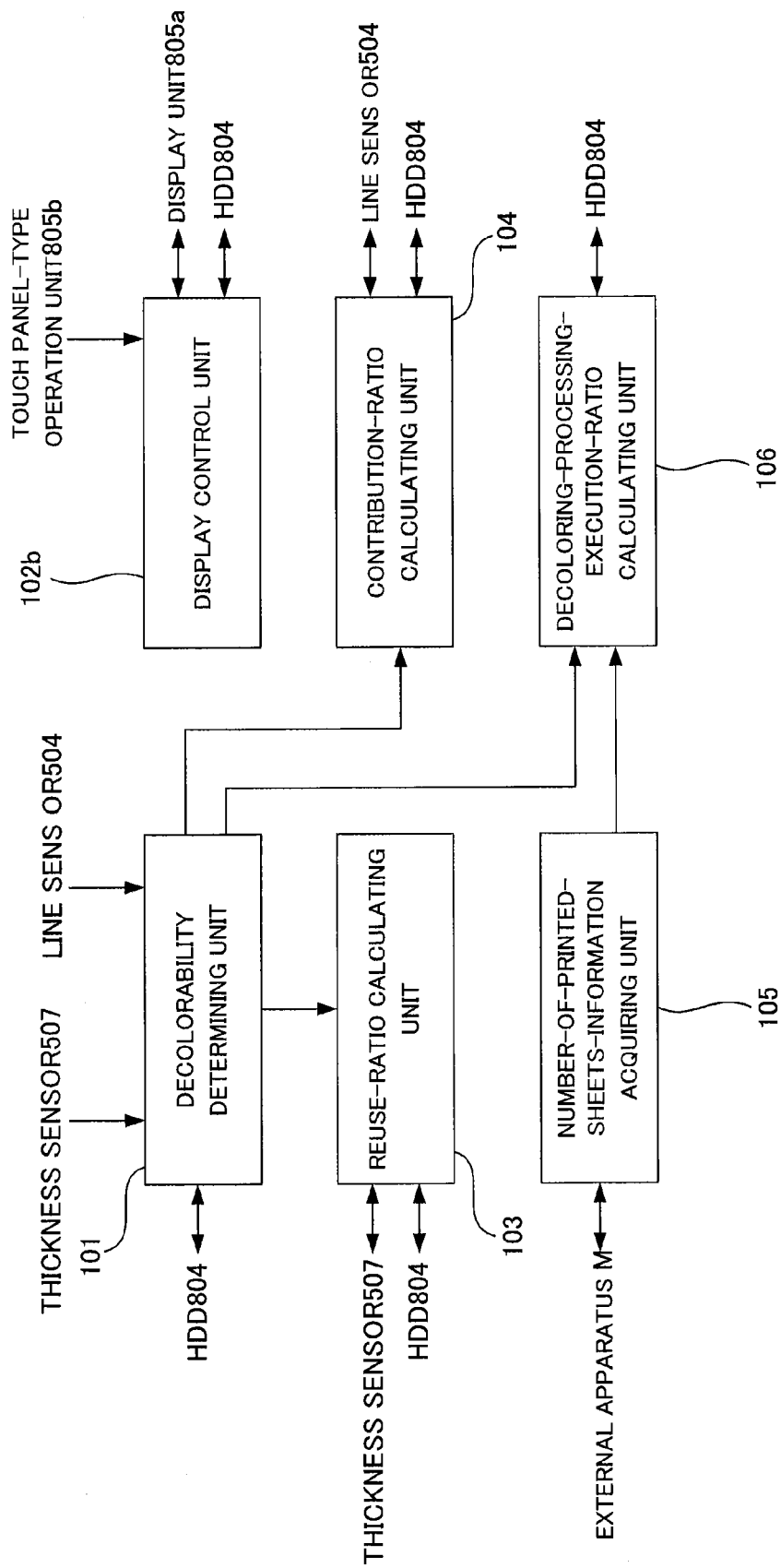
FIG. 17 is a functional block diagram for explaining an decoloring apparatus E2 according to a second embodiment.

FIG. 17 is a functional block diagram for explaining an decoloring apparatus E2 according to the second embodiment.

The decoloring apparatus E2 according to the second embodiment includes a display control unit 102b instead of the display control unit 102 in the decoloring apparatus E according to the first embodiment. The display control unit 102b has functions explained below in addition to the functions of the display control unit 102 in the decoloring apparatus E according to the first embodiment.

The HDD 804 (a storing unit) stores (1) an execution day of decoloring processing and (2) information indicating the number of sheets determined as decoloring processing unexecutable by the decolorability determining unit 101 in association with each other.

If a "display request for a totalization result in a unit period, which is any one period among plural periods different from one another" for "information indicating the number of sheets determined as decoloring processing unexecutable by the decolorability determining unit 101" stored in the HDD 804 based on information concerning the execution day of the decoloring processing is received on the touch panel-type operation unit 805b, the display control unit 102b causes the display unit 805a to screen-display the totalization result. Examples of the "unit period" include "day", "month", and "year".

The HDD 804 also stores "request information" indicating a display request for a totalization result in any one period in the plural periods different from one another is made.

When the decoloring apparatus E2 is restarted, the display control unit 102b causes the display unit 805a to screen-display a totalization result in a unit period indicated by the "request information" stored in the HDD 804.

Figure 18:
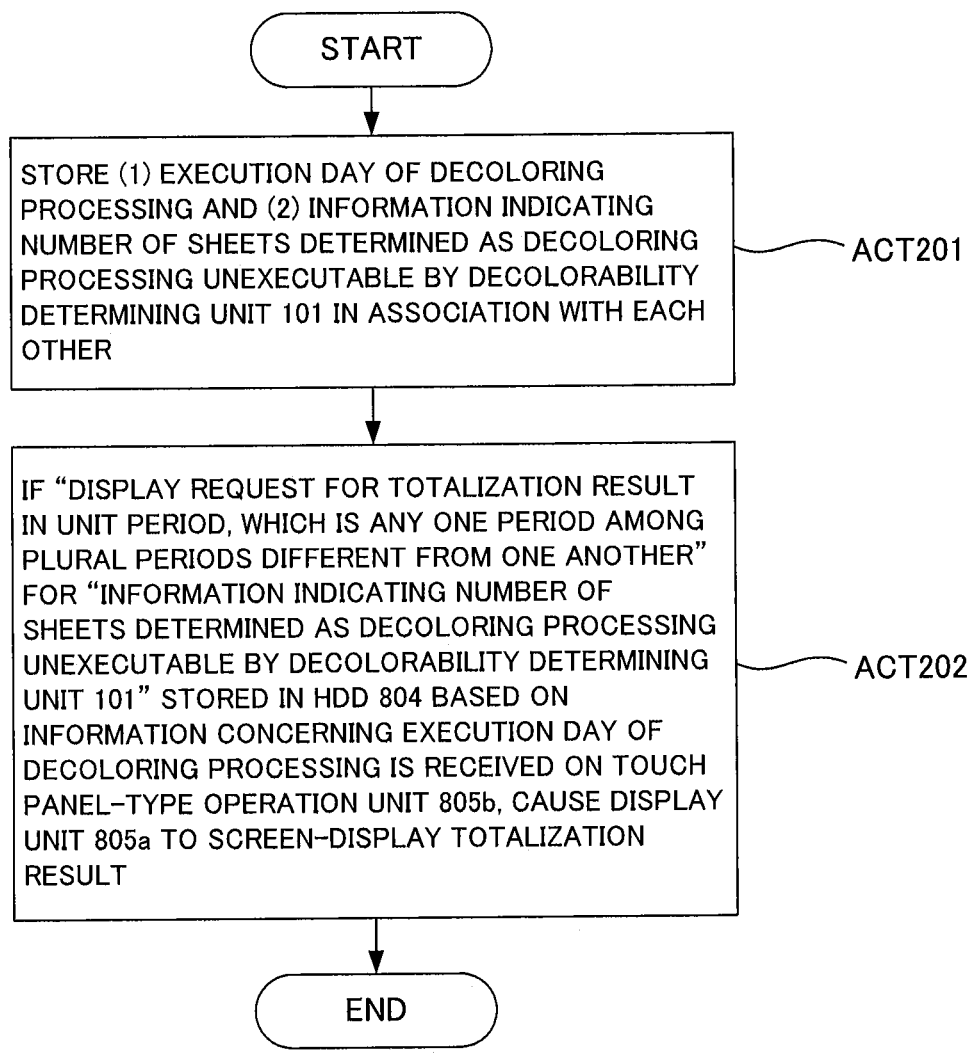
FIG. 18 is a flowchart for explaining a flow of processing (a display control method) in the decoloring apparatus E2 according to the second embodiment.

FIG. 18 is a flowchart for explaining a flow of processing (a display control method) in the decoloring apparatus E2 according to the second embodiment. The decoloring apparatus E2 according to the second embodiment executes processing explained below in addition to the processing in the decoloring apparatus E according to the first embodiment.

First, the HDD 804 (the storing unit) stores (1) execution day of decoloring processing and (2) information indicating the number of sheets determined as decoloring processing unexecutable by the decolorability determining unit 101 in association with each other (act 201).

Subsequently, if a "display request for a totalization result in a unit period, which is any one period among plural periods different from one another" for "information indicating the number of sheets determined as decoloring processing unexecutable by the decolorability determining unit 101" stored in the HDD 804 based on information concerning the execution day of the decoloring processing is received on the touch panel-type operation unit 805b, the display control unit 102b causes the display unit 805a to screen-display the totalization result (Act 202).

Figure 19:
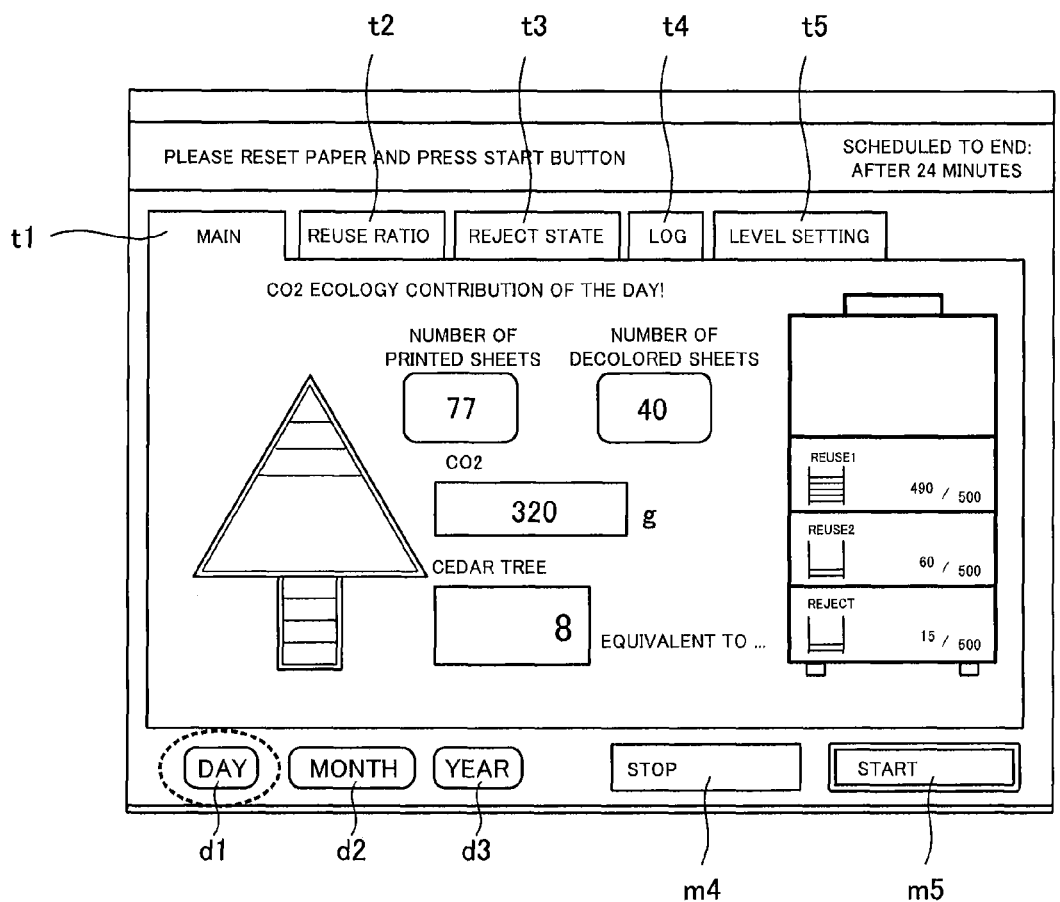
FIG. 19 is a diagram of an example of a main menu screen displayed on a display unit 805*a* by a display control unit 102*b* in the decoloring apparatus E2 according the second embodiment.
Figure 20:
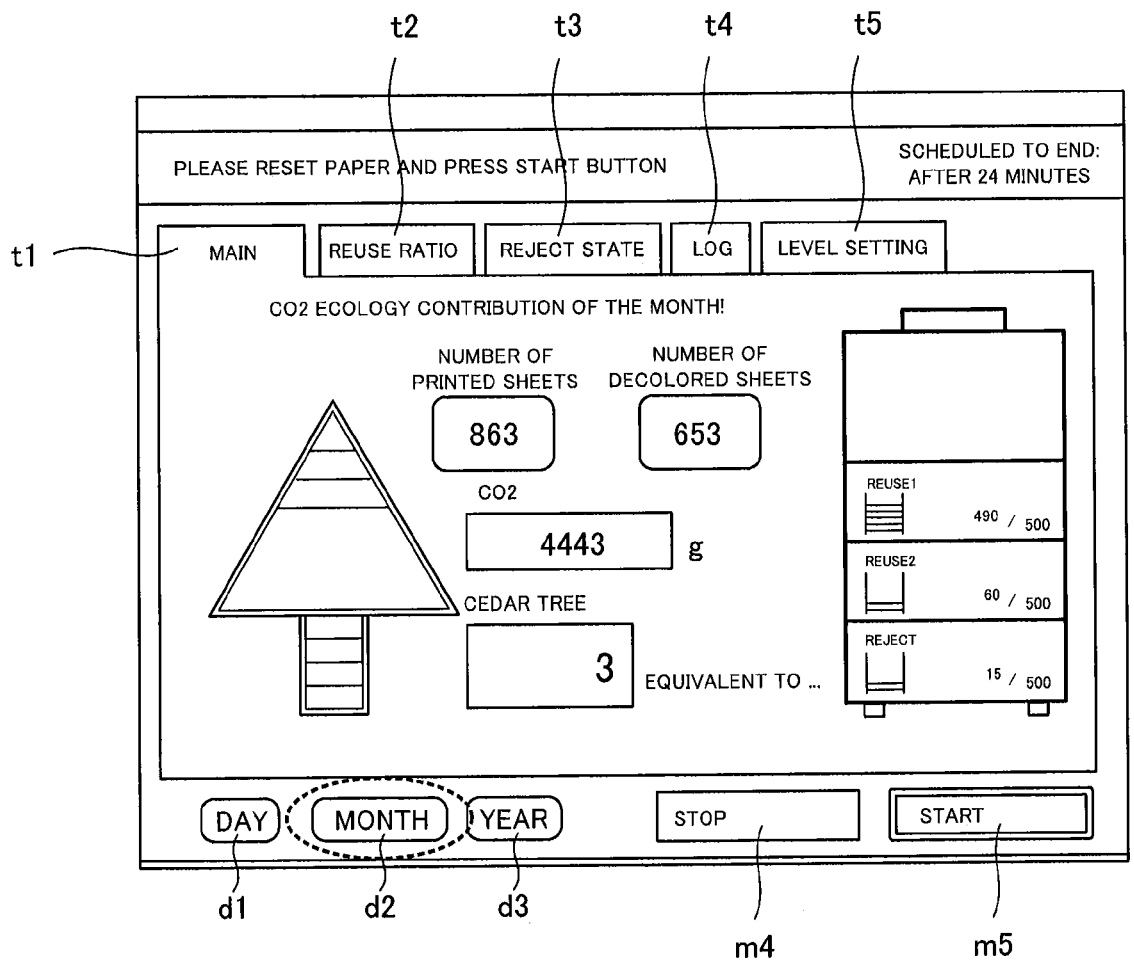
FIG. 20 is a diagram of an example of the main menu screen displayed on the display unit 805*a* by the display control unit 102*b* in the decoloring apparatus E2 according to the second embodiment.
Figure 21:
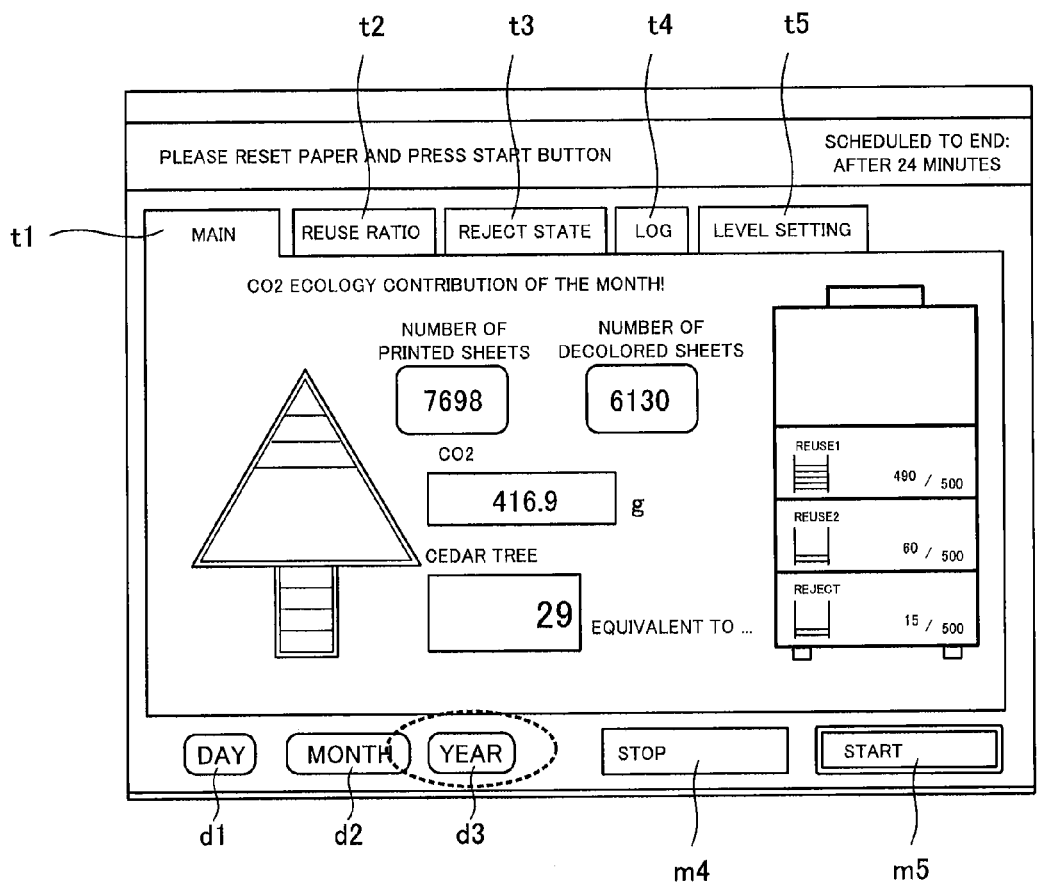
FIG. 21 is a diagram of an example of the main menu screen displayed on the display unit 805*a* by the display control unit 102*b* in the decoloring apparatus E2 according to the second embodiment.

FIGS. 19 to 21 are diagrams of examples of main menu screens displayed on the display unit 805a by the display control unit 102b in the decoloring apparatus E2 according to the second embodiment.

As shown in FIGS. 19 to 21, the display control unit 102b displays a day unit totalization button d1, a month unit totalization button d2, and a year unit totalization button d3 in lower parts of menu screens displayed by selecting the tabs t1 to t5.

If a user presses any one of these totalization buttons d1 to d3 by operating the touch panel-type operation unit 805b, a result of the button selection is stored in the HDD 804.

When the menu screen is displayed on the display unit 805a, if the user presses any one of the day unit button d1, the month unit button d2, and the year unit button d3 is pressed, the display control unit 102b switches display contents on the display unit 805a to screen display obtained by totalizing data in the respective units. FIG. 19 is a diagram of a screen display example at the time when the day unit totalization button d1 is selected. FIG. 20 is a diagram of a screen display example at the time when the month unit totalization button d2 is selected. FIG. 21 is a diagram of a screen display example at the time when the year unit totalization button d3 is selected.

When the decoloring apparatus E2 is started next time, the display control unit 102b causes the display unit 805a to display a menu screen based on the selection result stored in the HDD 804 on the basis of the last operation.

By adopting such a configuration, the user can easily grasp a sheet reuse ratio by the decoloring processing in the day unit, the month unit, and the year unit. As a result, it is possible to improve awareness of the user concerning paper reuse and improve promotion of reuse of paper.

Further, according to the second embodiment, for example, it is possible to provide an decoloring apparatus having a configuration explained below.

(1). The decoloring apparatus having the configuration explained above: wherein the storing unit stores an execution day of decoloring processing and information indicating the number of sheets determined as decoloring processing unexecutable by the decolorability determining unit in association with each other, the decoloring apparatus further includes an operation input unit configured to receive an operation input of a user, and if a display request for a totalization result in a unit period, which is any one period among plural periods different from one another, for information stored in the storing unit indicating the number of sheets determined as decoloring processing unexecutable by the decolorability determining unit, which is based on information concerning the execution day of the decoloring processing, is received on the operation input unit, the display control unit causes the display to screen-display the totalization result.

(2). The decoloring apparatus of (1), wherein the storing unit stores request information indicating the display request for the totalization result in any one period among the plural periods different from one another is made, and the display control unit causes, when the decoloring apparatus is restarted, the display to screen-display a totalization result in a unit period indicated by the request information stored in the storing unit.

Third Embodiment

A third embodiment is explained below.

The third embodiment is a modification of the embodiments explained above. Therefore, components having functions same as those of the components already explained in the embodiments are denoted by the same reference numerals and signs and explanation of the components is omitted.

Figure 22:
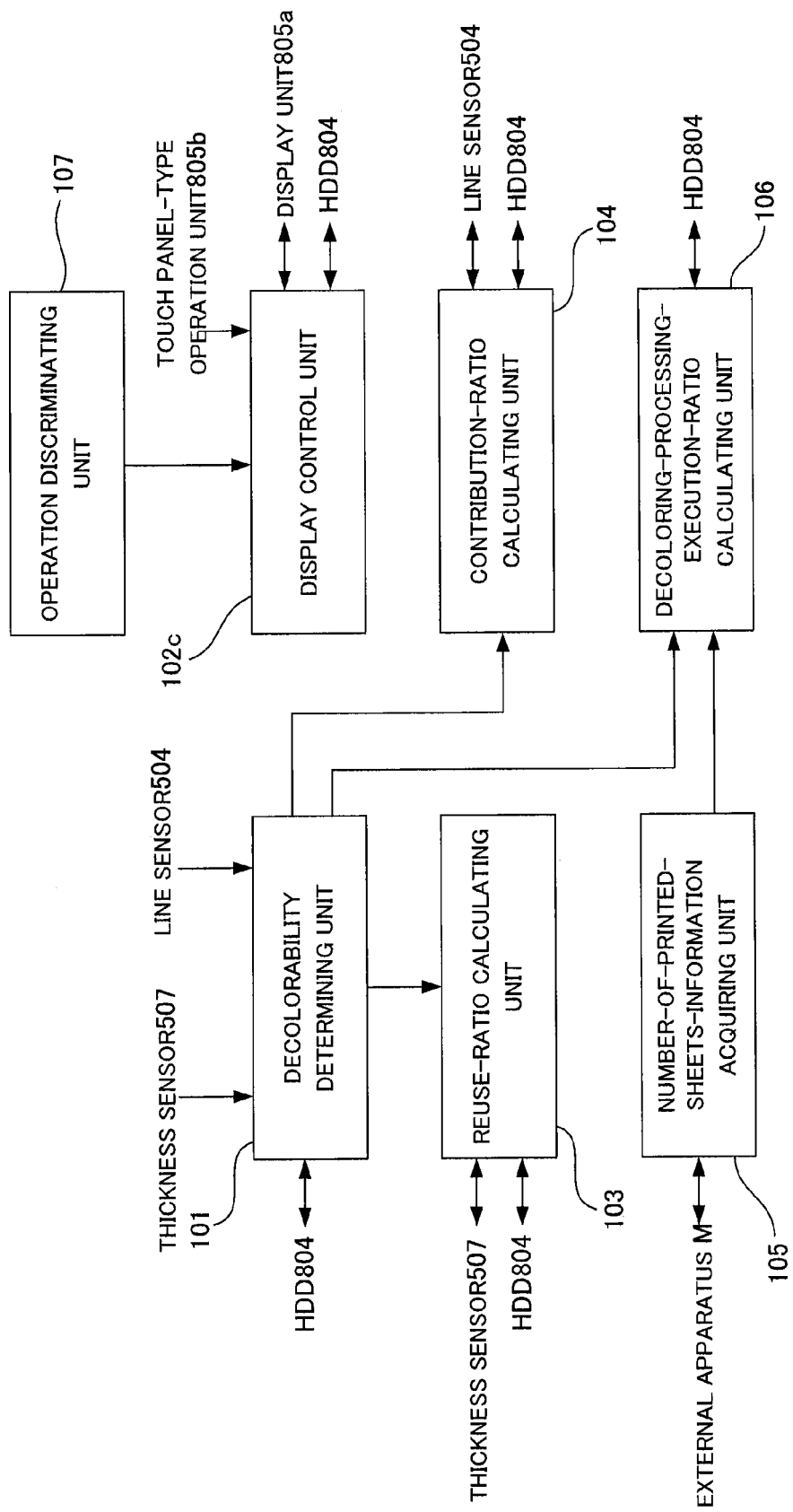
FIG. 22 is a functional block diagram for explaining an decoloring apparatus E3 according to a third embodiment.

FIG. 22 is a functional block diagram for explaining an decoloring apparatus E3 according to the third embodiment.

The decoloring apparatus E3 according to the third embodiment includes an operation discriminating unit 107 in addition to the components of the decoloring apparatus E according to the first embodiment. The decoloring apparatus E3 according to the third embodiment includes a display control unit 102c instead of the display control unit 102 in the decoloring apparatus E according to the first embodiment. The display control unit 102c has functions explained below in addition to the functions of the display control unit 102 in the decoloring apparatus E according to the first embodiment.

The operation discriminating unit 107 discriminates whether the decoloring apparatus E3 is performing a warming-up operation that is performed during operation start or during return from a sleep state.

If the operation discriminating unit 107 discriminates that the decoloring apparatus E3 is performing the warming-up operation, the display control unit 102c causes the display unit 805a to guidance-display "information indicating a method of using the decoloring apparatus E3" stored in the HDD 804.

If the operation discriminating unit 107 discriminates that the decoloring apparatus E3 is performing the warming-up operation, the display control unit 102c can also cause the display unit 805a to guidance-display "information indicating a method of using an image forming apparatus" stored in the HDD 804.

Figure 23:
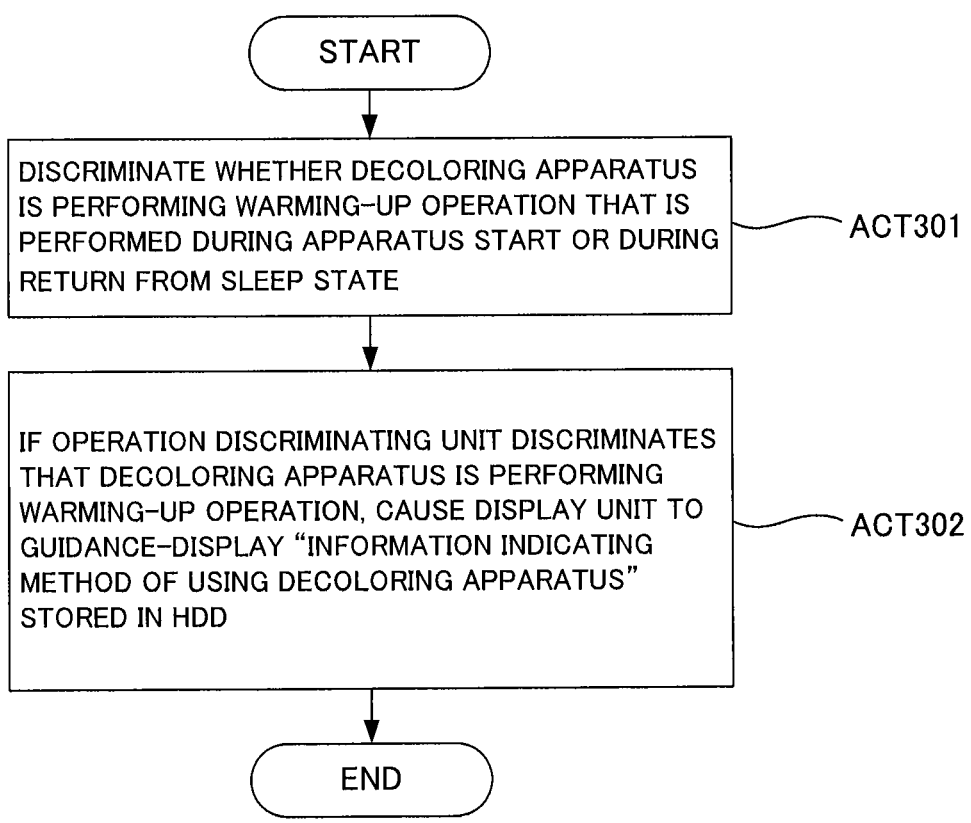
FIG. 23 is a flowchart for explaining a flow of processing (a display control method) in the decoloring apparatus E3 according to the third embodiment.

FIG. 23 is a flowchart for explaining a flow of processing (a display control method) in the decoloring apparatus E3 according to the third embodiment. The decoloring apparatus E3 according to the third embodiment executes processing explained below in addition to the processing according to the embodiments.

The operation discriminating unit 107 discriminates whether the decoloring apparatus E3 is performing a warming-up operation that is performed during apparatus start or during return from a sleep state (Act 301).

If the operation discriminating unit 107 discriminates that the decoloring apparatus E3 is performing the warming-up operation, the display control unit 102c causes the display unit 805a to guidance-display "information indicating a method of using the decoloring apparatus E3" or "information indicating a method of using an image forming apparatus" stored in HDD 804 (Act 302).

The display control unit 102c causes, for example, based on setting contents set in advance by an operation input to the touch panel-type operation unit 805b by a user, the display unit 805a to perform screen display of any one of the "information indicating a method of using the decoloring apparatus E3" and the "information indicating a method of using the image forming apparatus" or both.

If the decoloring apparatus E3 is in the warming-up state, the display control unit 102c causes the display unit 805a to screen-display a "function of the decoloring apparatus E3", a "function of an external apparatus such as the image forming apparatus connected to the decoloring apparatus E3 through a network", or the like and causes the display unit 805a to display, in a part of the screen, a progress bar used as a reference for determining how long more it takes to end the warming-up.

Figure 24:
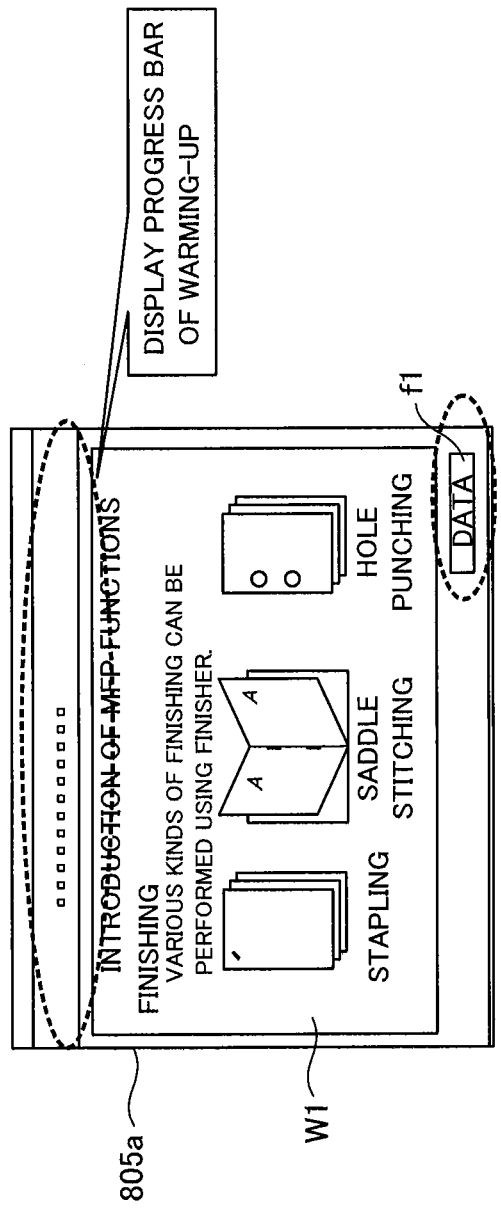
FIG. 24 is a diagram of a state of guidance display.
Figure 25:
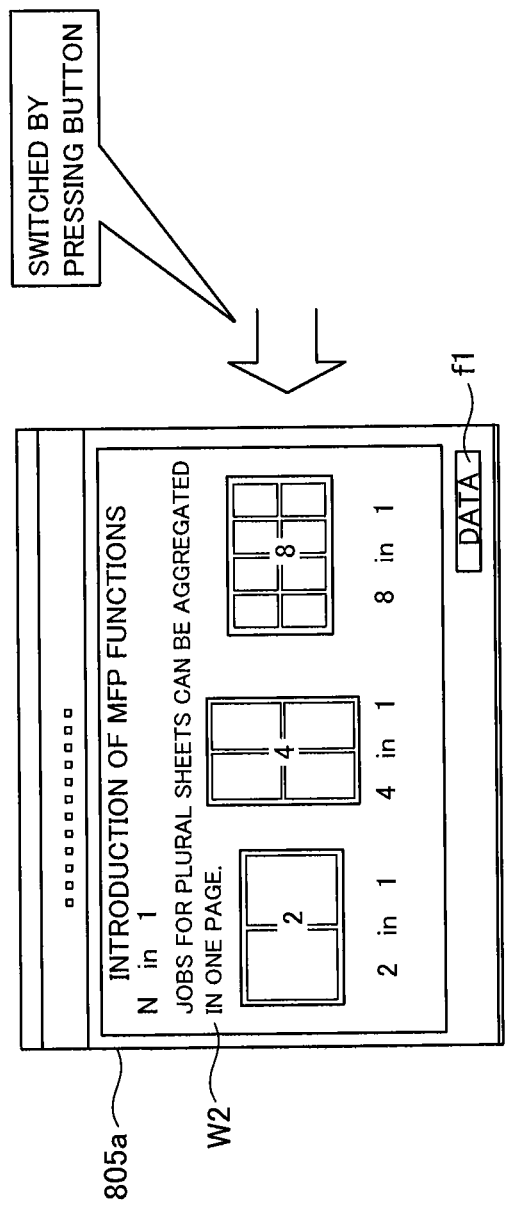
FIG. 25 is a diagram of a state of guidance display.
Figure 26:
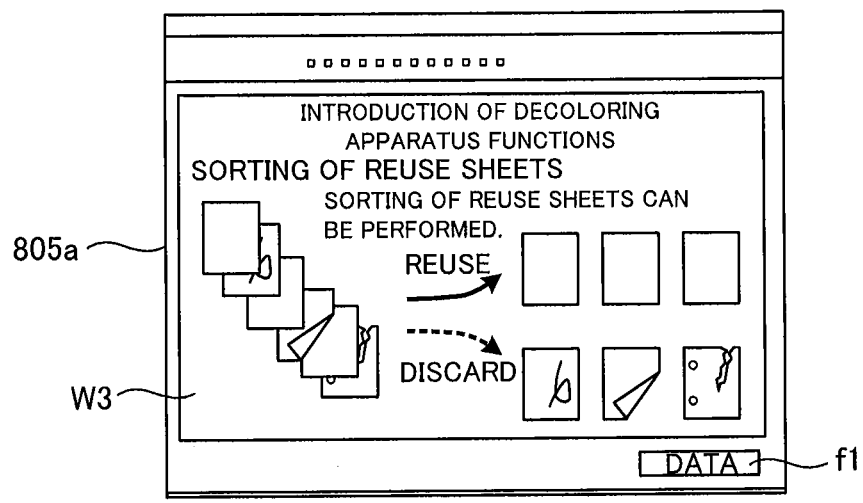
FIG. 26 is a diagram of a state of guidance display.

If the user presses a data button f1 in a state of the guidance display shown in FIGS. 24 to 26, the display control unit 102c can cause, using data stored in the HDD 804, the display unit 805a to display a screen on which contents of a "reuse ratio", a "reject state", a "log", and a "level setting" until the last operation of the decoloring apparatus E3 are shown.

Figure 27:
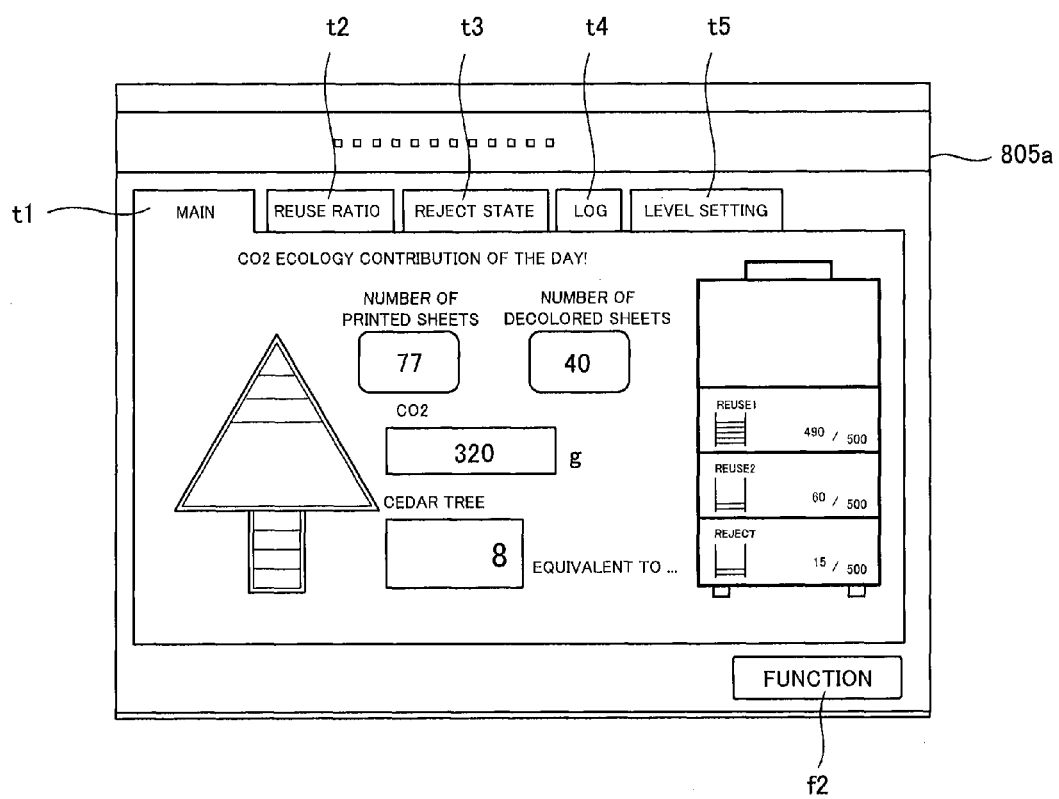
FIG. 27 is a diagram of a state of guidance display.

If the user presses a function button f2 in a state of guidance display shown in FIG. 27, the display control unit 102c shifts to the state of the guidance display shown in FIGS. 24 to 26.

In this way, in the third embodiment, during the warming-up operation in the decoloring apparatus E3, introduction of functions of the decoloring apparatus E3, the image forming apparatus connected to the decoloring apparatus E3 through the network, and the like is displayed on the display unit 805a. It is also possible to switch and display various kinds of information and the like concerning the decoloring processing in the decoloring apparatus E3.

By adopting such a configuration, during time when the decoloring apparatus E3 is performing the warming-up operation and cannot perform the decoloring processing, it is possible to cause the user to visually recognize functions and accumulated data of the decoloring apparatus E3 and the image forming apparatus provided around the decoloring apparatus E3.

Consequently, it is possible to realize prevention of setting of an decoloring processing unexecutable sheet (a sheet on which characters are written with a ballpoint pen, a stapled sheet bundle, etc.), improvement of a success ratio of the decoloring processing, improvement of environment awareness, and the like. Further, the user can effectively use a waiting time during the warming-up of the decoloring apparatus E3. Therefore, it is possible to contribute to a reduction in stress due to the waiting time.

Further, according to the third embodiment, for example, it is possible to provide an decoloring apparatus having a configuration explained below.

(1). The decoloring apparatus having the configuration explained above including an operation discriminating unit configured to discriminate whether the decoloring apparatus is performing a warming-up operation, wherein
if the operation discriminating unit discriminates that the decoloring apparatus is performing the warming-up operation, the display control unit guidance-displays information indicating a method of using the decoloring apparatus stored in the storing unit.

(2). The decoloring apparatus having the configuration explained above, wherein, if the operation discriminating unit discriminates that the decoloring apparatus is performing the warming-up operation, the display control unit guidance-displays information indicating a method of using the image forming apparatus stored in the storing unit.

Fourth Embodiment

A fourth embodiment is explained below.

The fourth embodiment is a modification of the embodiments explained above. Therefore, components having functions same as those of the components already explained in the embodiments are denoted by the same reference numerals and signs and explanation of the components is omitted.

Figure 28:
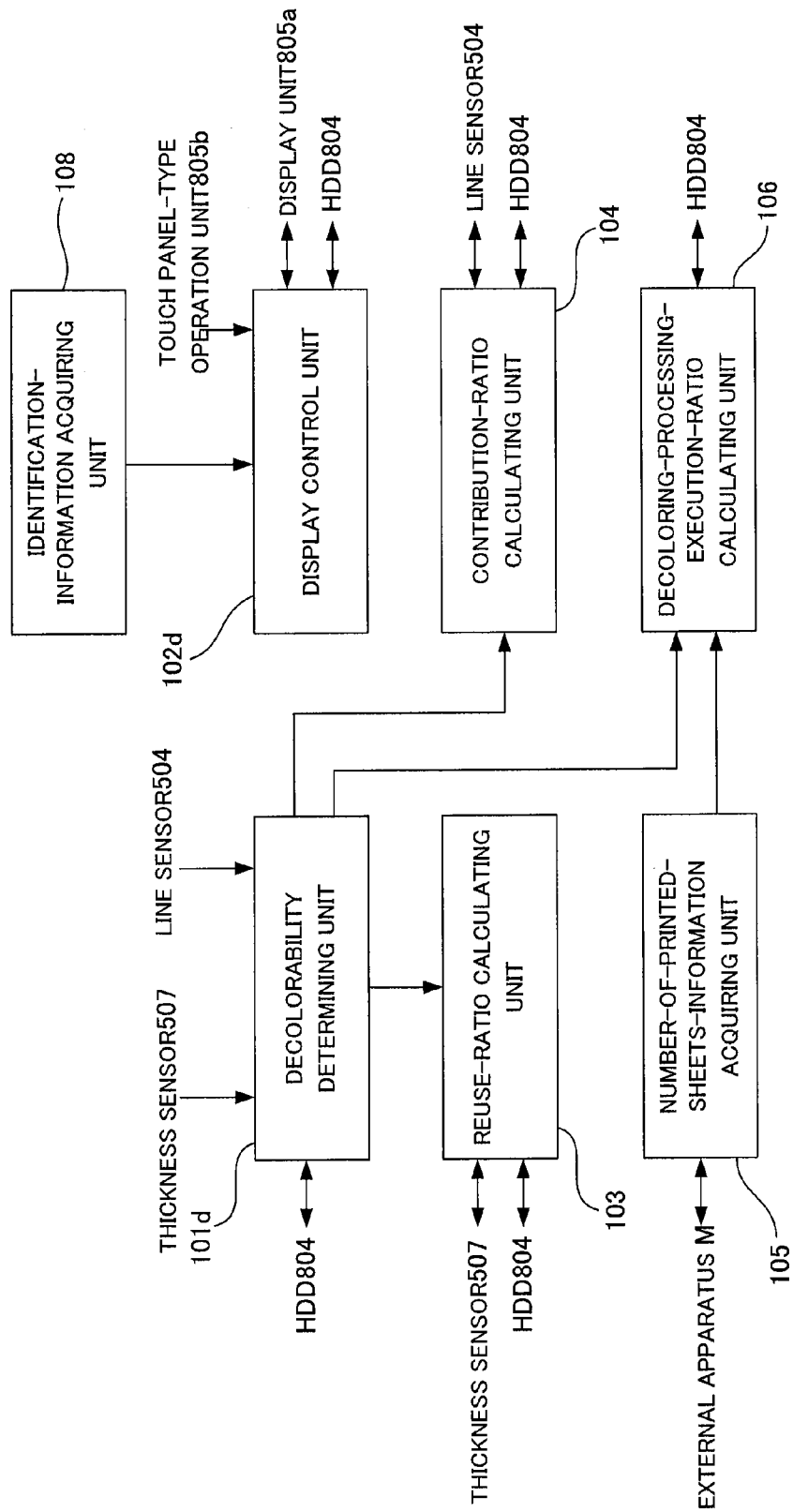
FIG. 28 is a functional block diagram for explaining an decoloring apparatus E4 according to a fourth embodiment.

FIG. 28 is a functional block diagram for explaining an decoloring apparatus E4 according to the fourth embodiment.

The decoloring apparatus E4 according to the fourth embodiment includes an identification-information acquiring unit 108 in addition to the components of the decoloring apparatus E according to the first embodiment. The decoloring apparatus E4 according to the first embodiment includes a display control unit 102d instead of the display control unit 102 in the decoloring apparatus E according to the first embodiment. The display control unit 102d has functions explained below in addition to the functions of the display control unit 102 in the decoloring apparatus E according to the first embodiment.

The identification-information acquiring unit 108 acquires identification information of a user who instructs execution of the decoloring processing in the decoloring apparatus E4. The identification-information acquiring unit 108 acquires, as user identification information, for example, ID information read by the IC card reader 807.

The HDD 804 stores the identification information of the user who instructs execution of the decoloring processing and "information indicating the number of sheets determined as decoloring processing unexecutable by the decolorability determining unit 101d" in association with each other.

If the identification-information acquiring unit 108 acquires identification information, the display control unit 102d causes the display unit 805a to screen-display a totalization result of the "information indicating the number of sheets determined as decoloring processing unexecutable by the decolorability determining unit 101d" stored in the HDD 804 corresponding to the user having the identification information.

If a sheet set as a detection target is a sheet on which the decoloring processing in the decoloring processing units 503a and 503b cannot be executed, the decolorability determining unit 101d determines, on the basis of a detection result in at least one of the image reading unit and the thickness sensor, to which of plural predetermined reasons a reason for unexecutability of the decoloring processing corresponds. The decolorability determining unit 101d causes the HDD 804 to store a result of the determination and the identification information of the user who instructs execution of the decoloring processing in association with each other.

If the identification-information acquiring unit 108 acquires identification information, the display control unit 102d causes the display unit 805a to screen-display (1) a determination result in the decolorability determining unit 101d associated with the identification information and (2) a predetermined advice content for improving a state of unexecutability of the decoloring processing based on the reason indicated by the determination result.

If the identification-information acquiring unit 108 acquires identification information, the display control unit 102d can cause the display unit 805a to ranking-display a totalization result of the information stored in the HDD 804 indicating the number of sheets determined as decoloring processing unexecutable by the decolorability determining unit 101d corresponding to a user having the identification information.

Figure 29:
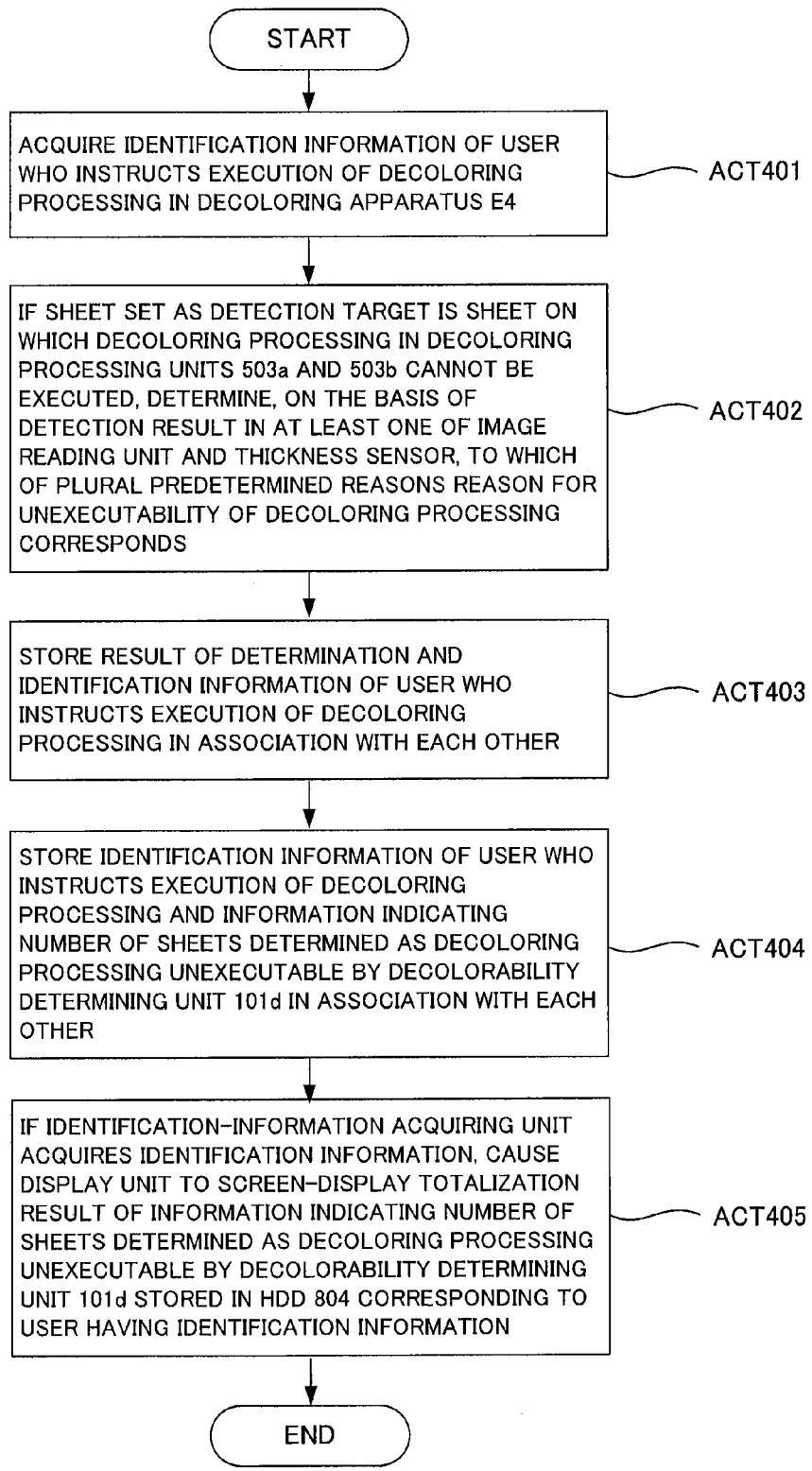
FIG. 29 is a flowchart for explaining a flow of processing (a display control method) in the decoloring apparatus E4 according to the fourth embodiment.

FIG. 29 is a flowchart for explaining processing (a display control method) in the decoloring apparatus E4 according to the fourth embodiment. The decoloring apparatus E4 according to the fourth embodiment executes processing explained below in addition to the processing according to the embodiments explained above.

The identification-information acquiring unit 108 acquires identification information of a user who instructs execution of the decoloring processing in the decoloring apparatus E4. The identification-information acquiring unit 108 acquires, as user identification information, for example, ID information read by the IC card reader 807 (Act 401).

If a sheet set as a detection target is a sheet on which the decoloring processing in the decoloring processing units 503a and 503b cannot be executed, the decolorability determining unit 101d determines, on the basis of a detection result in at least one of the image reading unit and the thickness sensor, to which of plural predetermined reasons a reason for unexecutability of the decoloring processing corresponds (Act 402).

The decolorability determining unit 101d causes the HDD 804 to store a result of the determination and the identification information of the user who instructs execution of the decoloring processing in association with each other (Act 403).

The HDD 804 stores the identification information of the user who instructs execution of the decoloring processing and "information indicating the number of sheets determined as decoloring processing unexecutable by the decolorability determining unit 101d" in association with each other (Act 404).

If the identification-information acquiring unit 108 acquires the identification information, the display control unit 102d causes the display unit 805a to screen-display a totalization result of the "information indicating the number of sheets determined as decoloring processing unexecutable by the decolorability determining unit 101d" stored in the HDD 804 corresponding to the user having the identification information (Act 405).

At this point, if the identification-information acquiring unit 108 acquires the identification information, the display control unit 102d causes the display unit 805a to screen-display (1) a determination result in the decolorability determining unit 101d associated with the identification information and (2) a predetermined advice content for improving a state of unexecutability of the decoloring processing based on the reason indicated by the determination result.

Figure 30:
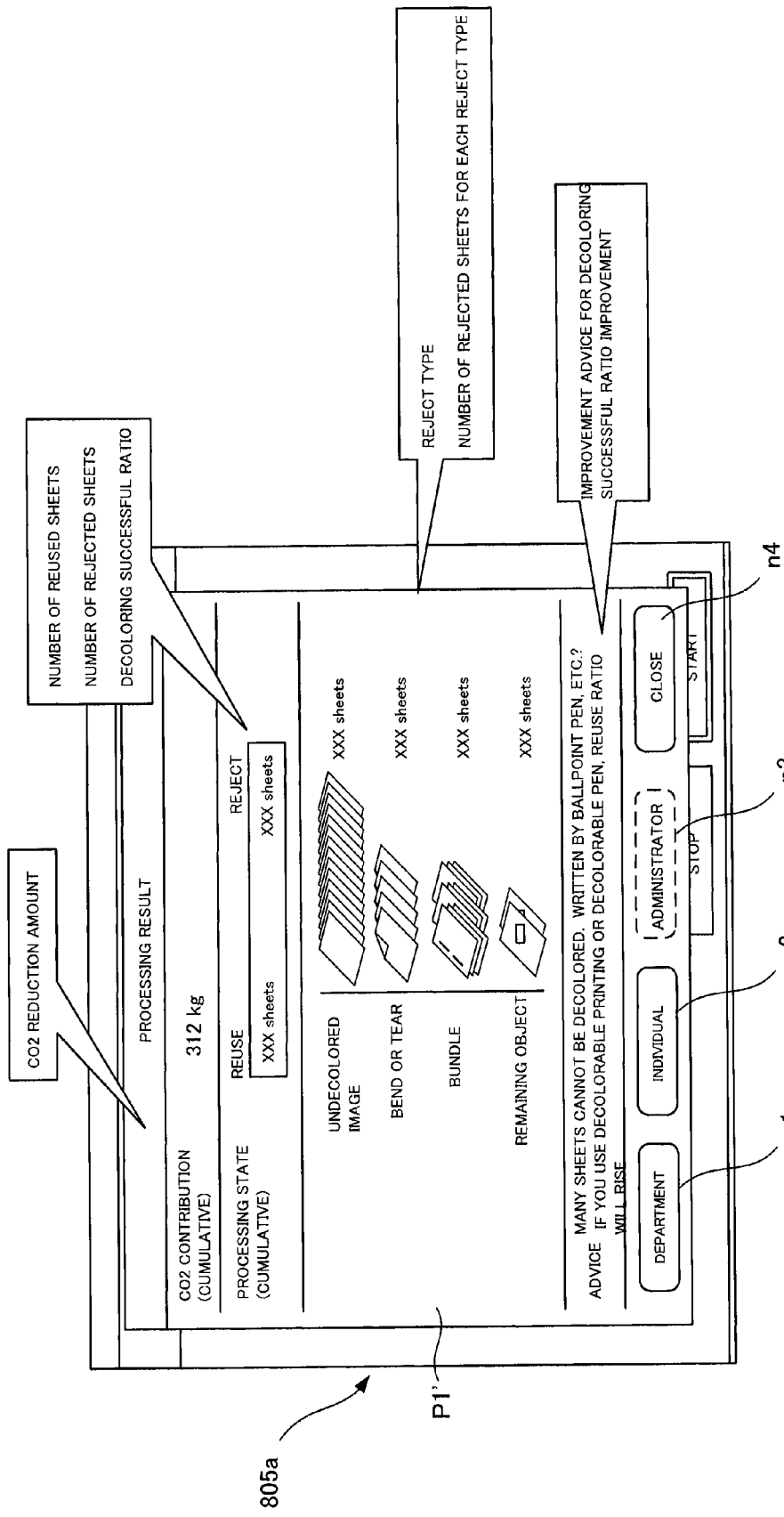
FIG. 30 is a diagram of an example of a screen displayed on the display unit 805*a* by a display control unit 102*d* when decoloring processing is completed or a stop button m4 is pressed.

FIG. 30 is a diagram of an example of a screen displayed on the display unit 805a by the display control unit 102d when an execution instruction for the decoloring processing is issued and the decoloring processing is completed or the stop button m4 is pressed in the main menu screen.

Figure 31:
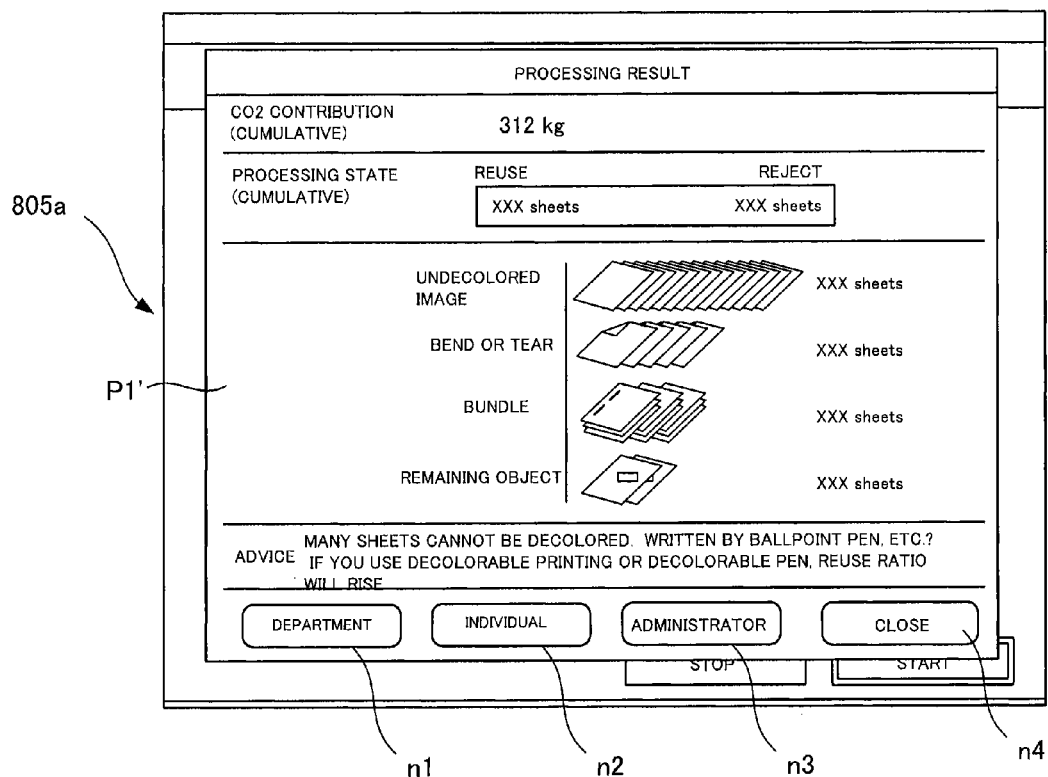
FIG. 31 is a diagram of a personal authentication screen P1'.

Until the user causes the IC card reader 807 to read an IC card and performs authentication processing, as indicated by a personal authentication screen P1' shown in FIG. 31, the display control unit 102d causes the display unit 805a to screen-display each of a department button n1, an individual button n2, and an administrator button n3 in an unselectable state (e.g., a gray-out state).

Figure 32:
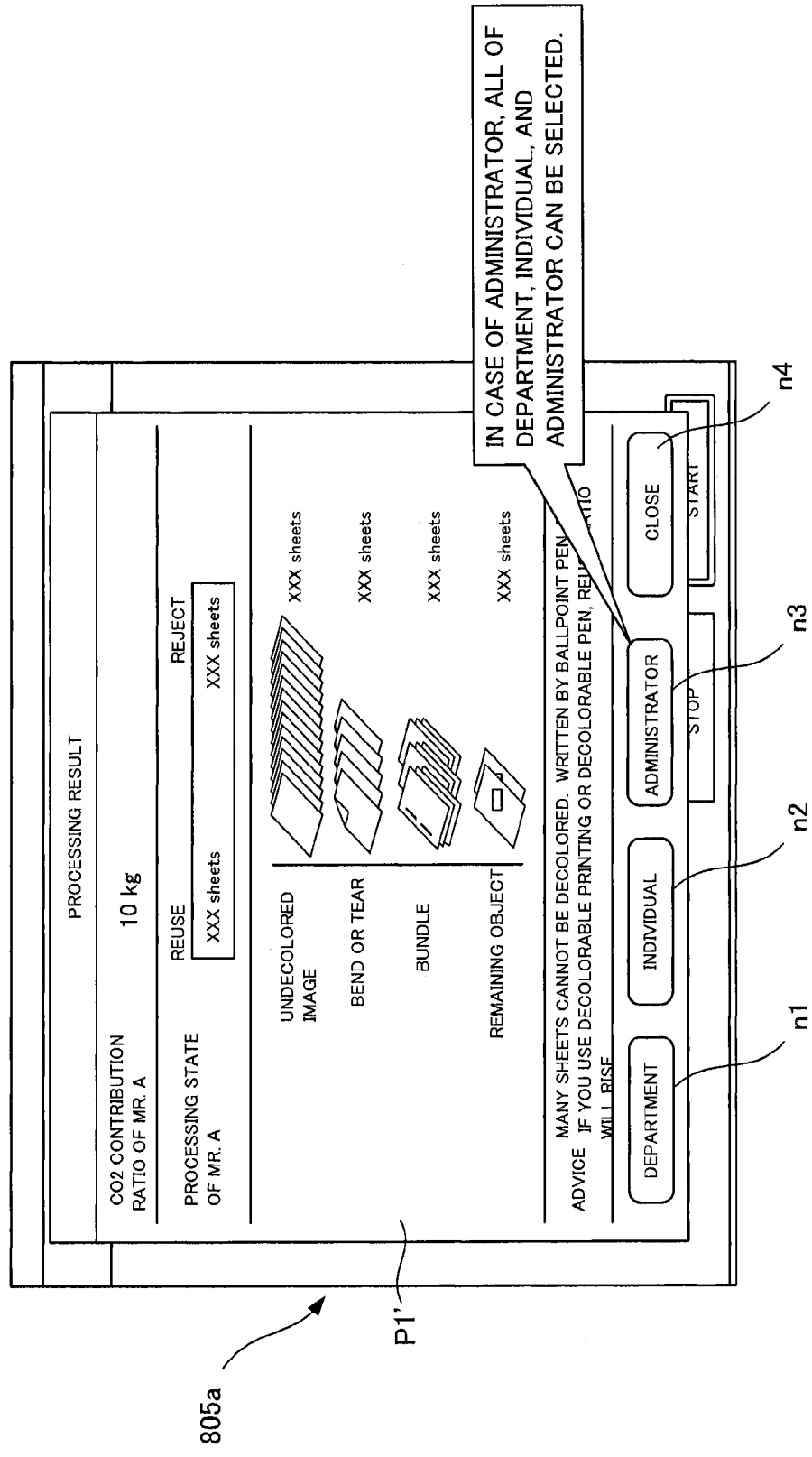
FIG. 32 is a diagram of the personal authentication screen P1'.

When the user causes the IC card reader 807 to read the IC card and performs the authentication processing, the display control unit 102d switches, on the basis of ID information acquired by the identification-information acquiring unit 108, the screen display to screen display on which the user can select only a button for which the user has viewing authority or operation authority (e.g., only the individual button n2 is made selectable) among the department button n1, the individual button n2, and the administrator button n3 unselectable on the screen shown in FIG. 32.

If the user is an administrator, the display control unit 102d changes all of the department button n1, the individual button n2, and the administrator button n3, which are unselectable on the screen shown in FIG. 32, to a selectable display state.

Figure 33:
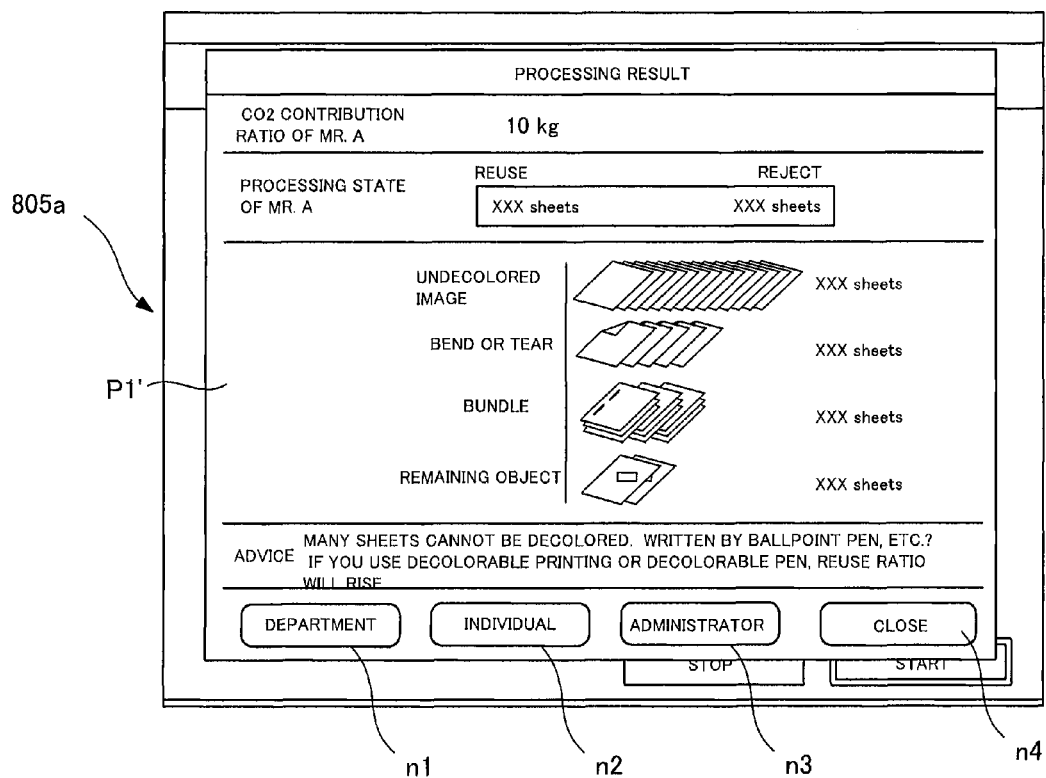
FIG. 33 is a diagram of the personal authentication screen P1'.

If the user presses the department button n1 on the screen shown in FIG. 32, the display control unit 102d causes the display unit 805a to screen-display information indicating a totalization result of a processing state in a department unit (see FIG. 33).

After the personal authentication ends, if a button for which the user has viewing authority or operation authority is only the individual button n2, the display control unit 102d causes, on the basis of a processing history stored in the HDD 804 in association with the ID information of the authenticated user, the display unit 805a to perform, for example, (1) information display of a totalization result or the like concerning a processing result of the decoloring processing by the individual user and (2) display of guidance for facilitating the decoloring processing.

Figure 34:
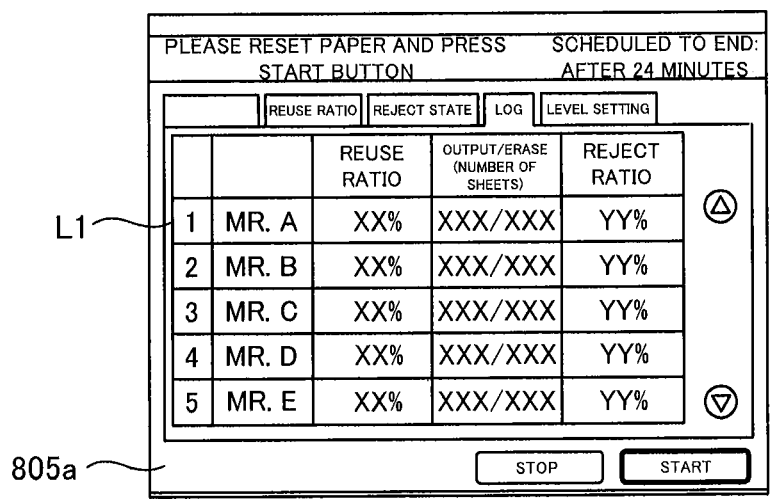
FIG. 34 is a diagram of an example of a ranking screen L1 displayed on the basis of a success ratio of decoloring processing for an authenticated individual user in a department on which order display of the user is performed.

FIG. 34 is a diagram of an example of a ranking screen L1, on which order display for the user in a department is performed, displayed on the basis of a success ratio of decoloring processing (a reuse ratio) of the authenticated individual user.

Figure 35:
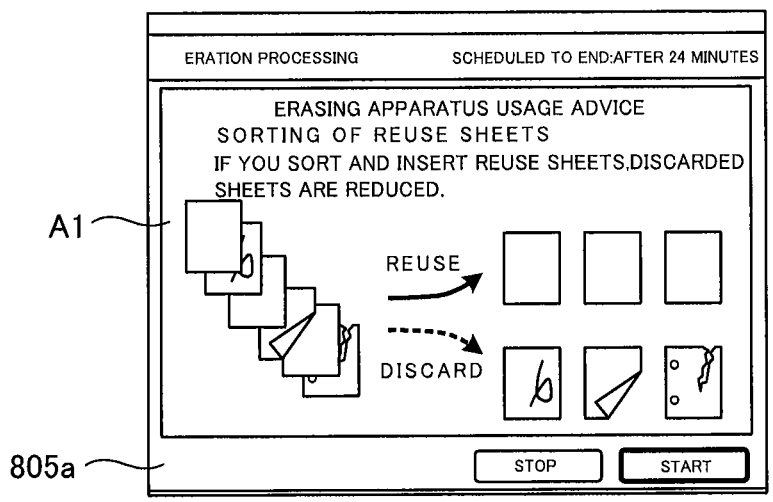
FIG. 35 is a diagram of an advice screen A1 on which a state of undecolorable sheet and an advice for improvement are displayed.

If there are a large number of sheets determined as undecolorable by the decolorability determining unit 101d (e.g., the sheets are inserted into the decoloring apparatus with staples left attached thereto), the display control unit 102d causes the display unit 805a to display an advice screen A1 on which a state of the undecolorable sheets and an advice for improvement are displayed (FIG. 35).

In this way, in the fourth embodiment, according to the personal authentication of the user, screen display is switched to display in which only a viewing button for totalization data for which the user has viewing authority among the department button n1, the individual button n2, and the administrator button n3 on the screen displayed on the display unit 805a can be pressed. The user can view various kinds of information by pressing these buttons that the user can press. Buttons for viewing totalization data for which the user does not have viewing authority are gray-out displayed.

By adopting such a configuration, the user can easily grasp a sheet reuse ratio of a department in which the user is involved and a sheet reuse ratio of the user by viewing totalization data corresponding to viewing authority given to the user. Therefore, it is possible to contribute to improvement of awareness of the user concerning improvement of a sheet reuse ratio.

Further, according to the fourth embodiment, for example, it is possible to provide an decoloring apparatus having a configuration explained below.

(1). The decoloring apparatus having the configuration explained above including an identification-information acquiring unit configured to acquire identification information of a user who instructs execution of the decoloring processing in the decoloring apparatus, wherein
the storing unit stores the identification information of the user who instructs execution of the decoloring processing and information indicating the number of sheets determined as decoloring processing unexecutable by the decolorability determining unit in association with each other, and
if the identification-information acquiring unit acquires the identification information, the display control unit causes the display to screen-display a totalization result of the information stored in the storing unit indicating the number of sheets determined as decoloring processing unexecutable by the decolorability determining unit corresponding to the user having the identification information.

(2). The apparatus of (1), wherein, if the sheet set as the detection target is a sheet on which the decoloring processing in the decoloring processing unit cannot be executed, the decolorability determining unit determines, on the basis of a detection result in at least one of the image reading unit and the thickness sensor, to which of plural predetermined reasons a reason for unexecutability of the decoloring processing corresponds and causes the storing unit to store a result of the determination and the identification information of the user who instructs execution of the decoloring processing in association with each other.

(3) The apparatus of (2), wherein, if the identification-information acquiring unit acquires identification information, the display control unit causes the display to screen-display the determination result in the decolorability determining unit associated with the identification information and a predetermined advice content for improving a state of undecolorability of the decoloring processing based on the reason indicated by the determination result.

(4) The apparatus of (1), wherein, if the identification-information acquiring unit acquires the identification information, the display control unit causes the display to ranking-display a totalization result of the information stored in the storing unit indicating the number of sheets determined as decoloring processing unexecutable by the decolorability determining unit corresponding to the user having the identification information.

Fifth Embodiment

A fifth embodiment is explained below.

The fifth embodiment is a modification of the embodiments explained above. Therefore, components having functions same as those of the components already explained in the embodiments are denoted by the same reference numerals and signs and explanation of the components is omitted.

Figure 36:
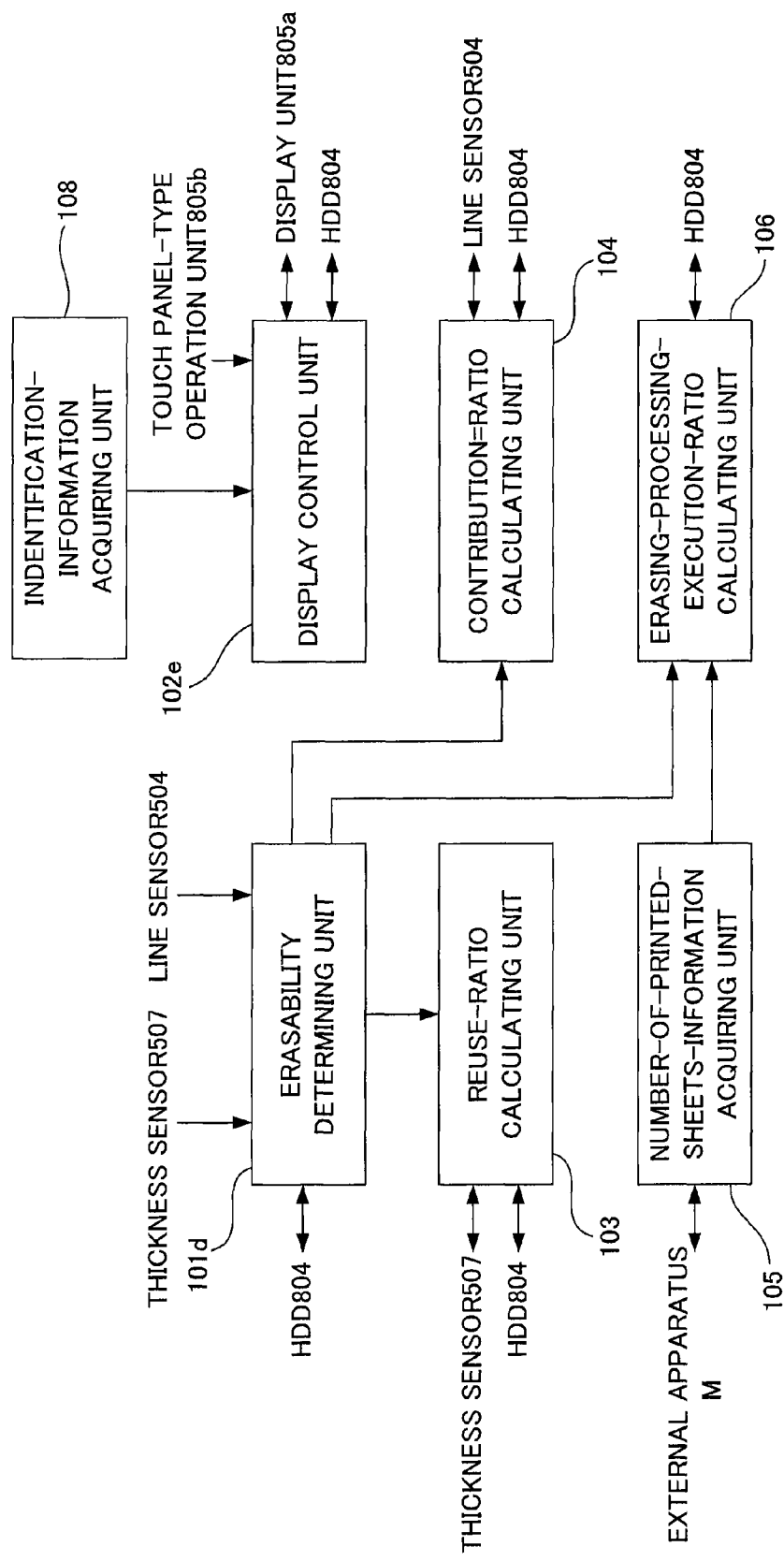
FIG. 36 is a functional block diagram for explaining an decoloring apparatus E5 according to a fifth embodiment.

FIG. 36 is a functional block diagram for explaining an decoloring apparatus E5 according to the fifth embodiment.

The decoloring apparatus E5 according to the fifth embodiment includes the identification-information acquiring unit 108 in addition to the components of the decoloring apparatus E according to the first embodiment. The decoloring apparatus E5 according to the fifth embodiment includes a display control unit 102e instead of the display control unit 102 in the decoloring apparatus E according to the first embodiment. The display control unit 102d has functions explained below in addition to the functions of the display control unit 102 in the decoloring apparatus E according to the first embodiment.

The HDD 804 cumulatively stores information indicating the number of sheets determined as decoloring processing unexecutable by a decolorability determining unit 101e.

When the decoloring processing by the decoloring processing units 503a and 503b is started, the display control unit 102e causes the display unit 805a to screen-display cumulative information in the past stored in the HDD 804.

The HDD 804 stores "identification information of a user who instructs execution of the decoloring processing", "information indicating a department to which the user having the identification information belongs", and "information indicating the number of sheets determined as decoloring processing unexecutable by the decolorability determining unit 101e" in association with one another.

If the identification-information acquiring unit 108 acquires the identification information of the user, the display control unit 102e causes the display unit 805a to screen-display a totalization result of the "information indicating the number of sheets determined as decoloring processing unexecutable by the decolorability determining unit 101e" stored in the HDD 804 based on a totalization reference designated in the operation input unit, which is one of "identification information" and "department to which a user having the identification information belongs".

Figure 37:
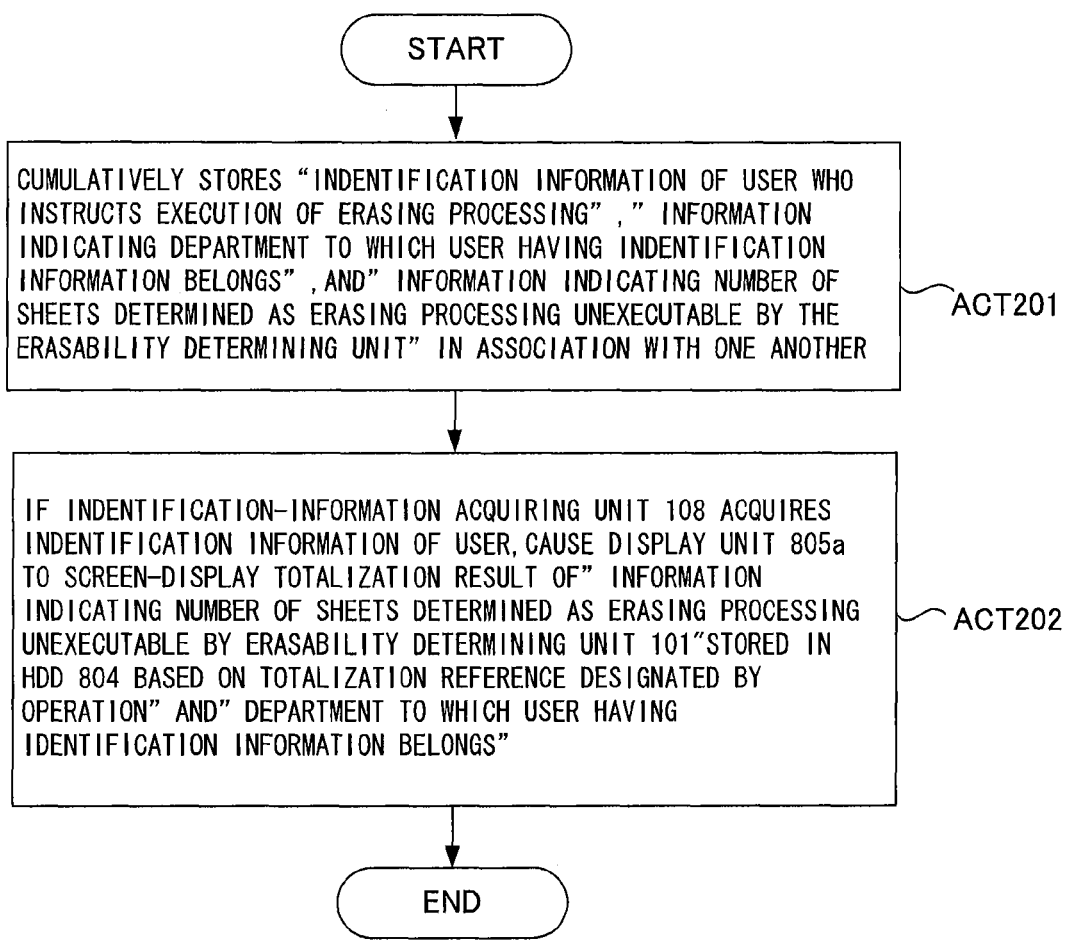
FIG. 37 is a flowchart for explaining a flow of processing (a display control method) in the decoloring apparatus E5 according to the fifth embodiment.

FIG. 37 is a flowchart for explaining a flow of processing (a display control method) in the decoloring apparatus E5 according to the fifth embodiment. The decoloring apparatus E5 according to the fifth embodiment executes processing explained below in addition to the processing according to the embodiments explained above.

The HDD 804 cumulatively stores "identification information of a user who instructs execution of the decoloring processing", "information indicating a department to which the user having the identification information belongs", and "information indicating the number of sheets determined as decoloring processing unexecutable by the decolorability determining unit 101e" in association with one another (Act 501).

If the identification-information acquiring unit 108 acquires the identification information of the user, the display control unit 102e causes the display unit 805a to screen-display a totalization result of the "information indicating the number of sheets determined as decoloring processing unexecutable by the decolorability determining unit 101e" stored in the HDD 804 based on a totalization reference designated in the operation input unit, which is one of "identification information" and "department to which a user having the identification information belongs" (Act 502). Examples of the totalization result include information indicating an environment contribution degree as a result of the decoloring processing and the number of decoloring processing unsuccessful sheets due to each of "undecolored image", "bend or tear", "bundle", and "remaining object", which are factors of unsuccessful decoloring processing.

When the decoloring processing by the decoloring processing units 503a and 503b is started, the display control unit 102e causes the display unit 805a to screen-display the cumulative information in the past stored in the HDD 804.

Figure 38:
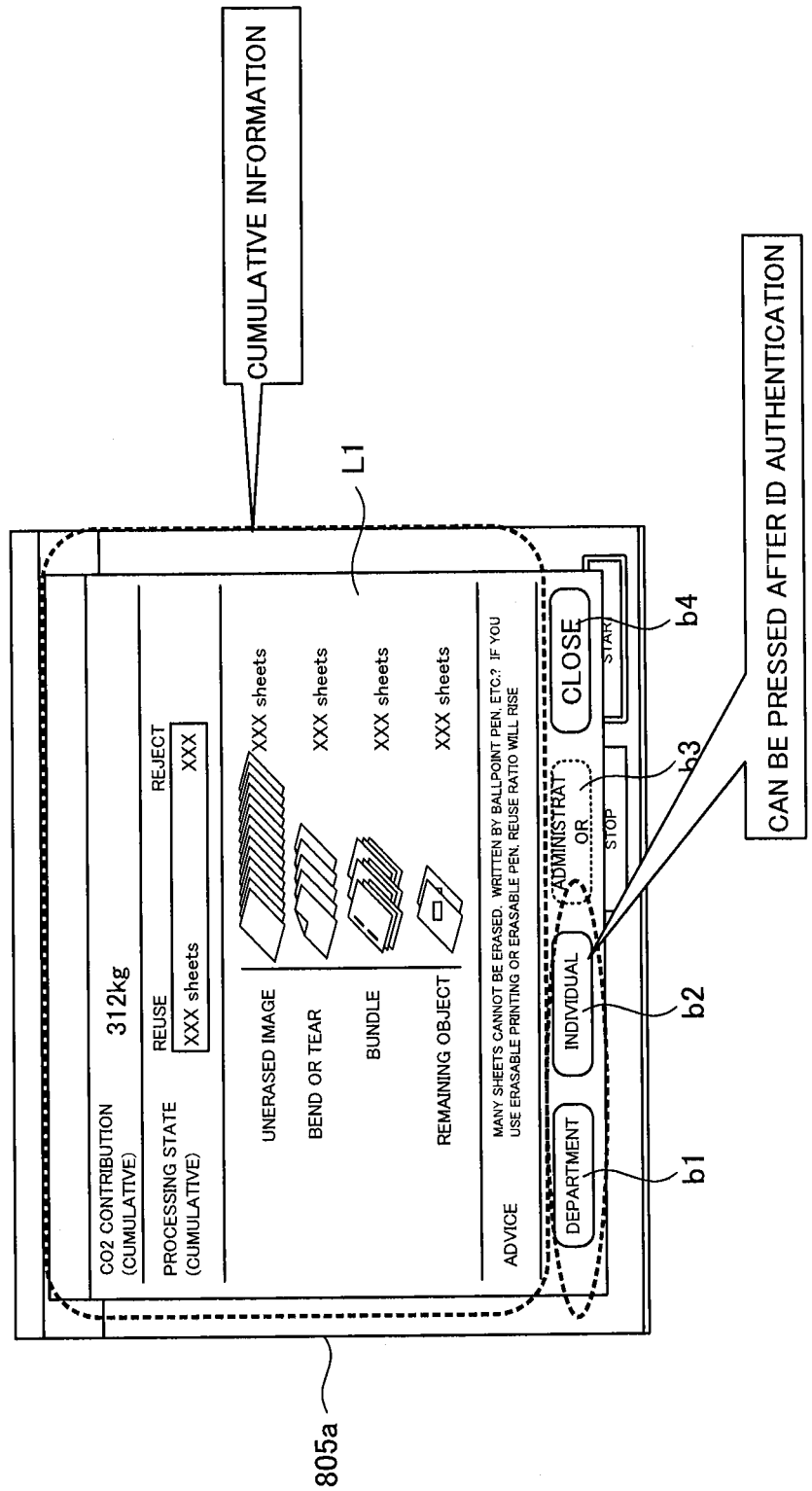
FIG. 38 is a diagram of an example of a screen L1 on which, display is switched and cumulative information is shown after sheets are set in a feeding cassette and after start of a main menu is pressed.

FIG. 38 is a diagram of an example of a screen L1, on which display is switched and the cumulative information is shown after sheets are set in a feeding cassette and after start of a main menu is pressed, displayed on the display unit 805a by the display control unit 102e.

As shown in FIG. 38, in a state in which personal authentication processing is not performed in the decoloring apparatus E5, the display control unit 102e unselectably displays the department button b1, the individual button b2, and the administrator button b3 in a gray-out state on the screen L1 on which the cumulative information is shown.

Figure 39:
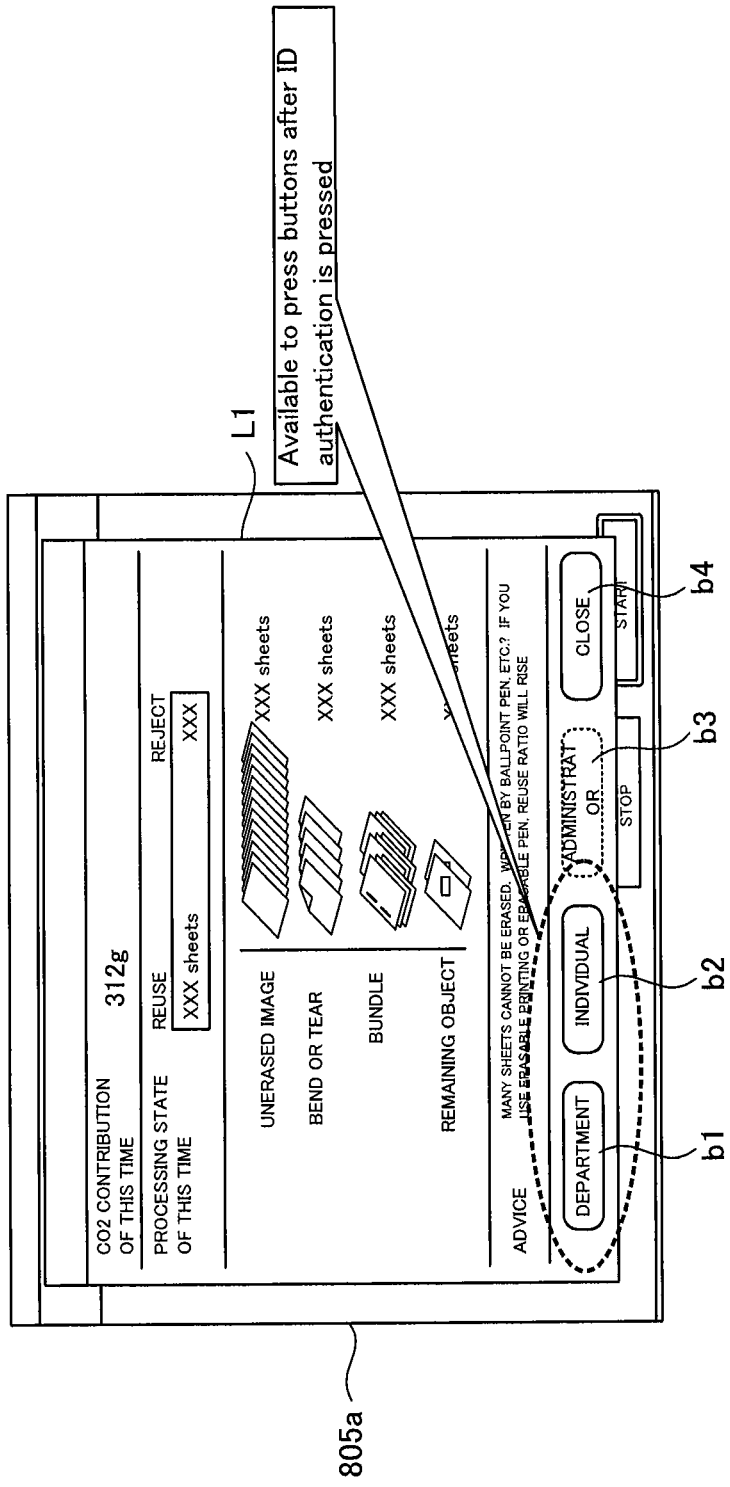
FIG. 39 is a diagram of an example of the screen L1 displayed on the display unit 805a by a display control unit 102e when personal acquisition processing is completed.

FIG. 39 is a diagram of an example of the screen L1 displayed on the display unit 805a by the display control unit 102e when the identification-information acquiring unit 108 acquires the identification information of the user and personal acquisition processing is completed.

Figure 40:
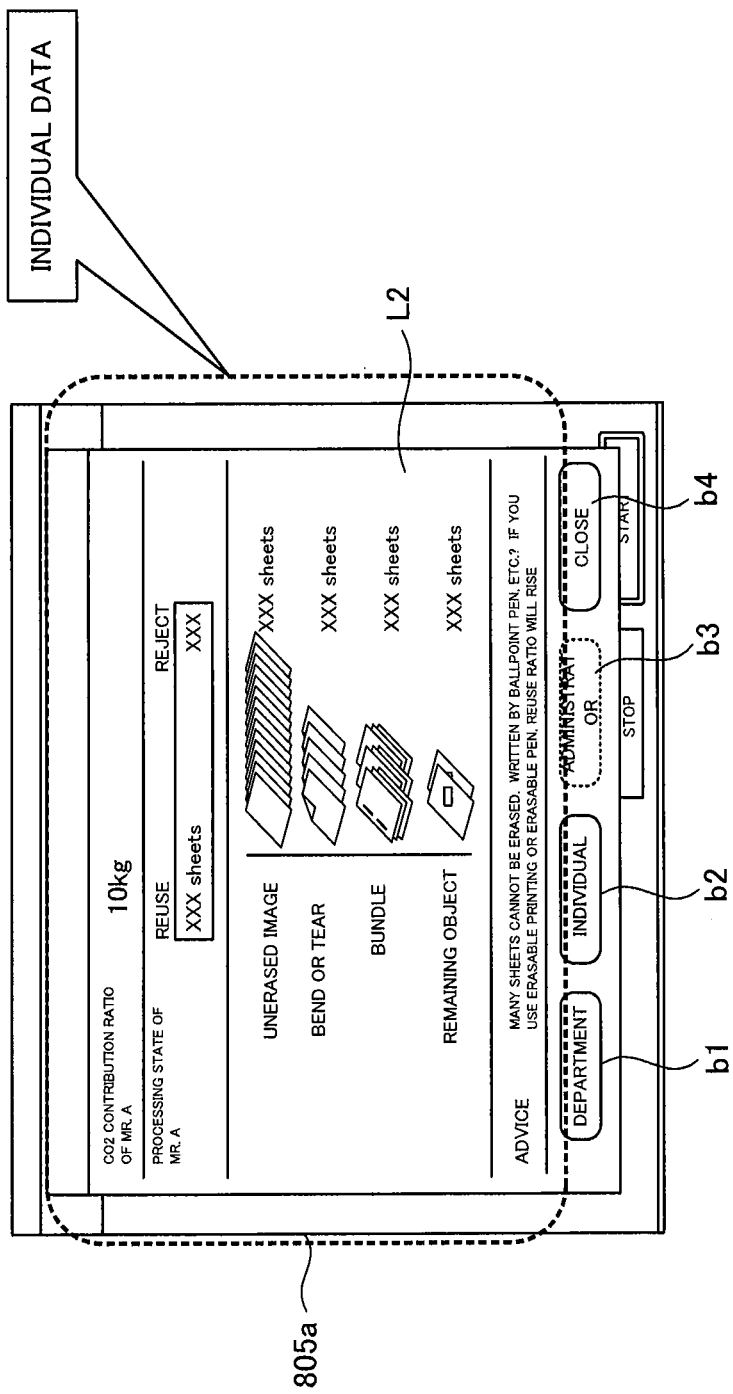
FIG. 40 is a diagram of an example of a screen L2 on which a totalization result and the like are shown.

If the user presses, for example, the individual button b2 by operating the touch panel-type operation unit 805b, the display control unit 102e causes the display unit 805a to display a screen L2 on which, for example, a totalization result of information concerning a processing result of the decoloring processing cumulatively stored in the HDD 804 in association with the individual user (Mr. A) on the screen L1 is shown (see FIG. 40).

If the user presses the department button b1 by operating the touch panel-type operation unit 805b, the display control unit 102e causes the display unit 805a to display a screen L3 on which, for example, a totalization result of information concerning a processing result of the decoloring processing cumulatively stored in the HDD 804 in association with a department to which the individual user belongs on the screen L1 is shown (see FIG. 41).

In this way, according to the fifth embodiment, it is possible to display an operation state of the decoloring apparatus and a sheet state in detail, provide a user with personal information and information in a small unit, and encourage education and improvement concerning an environmental load reduction.

Further, according to the fifth embodiment, for example, it is possible to provide an decoloring apparatus having a configuration explained below.

(1). The decoloring apparatus having the configuration explained above, wherein the storing unit cumulatively stores the information indicating the number of sheets determined as decoloring processing unexecutable by the decolorability determining unit, and when the decoloring processing by the decoloring processing unit is started, the display control unit causes the display to screen-display cumulative information in the past stored in the storing unit.

(2). The apparatus of (1), further including:

an identification-information acquiring unit configured to acquire identification information of a user who instructs execution of the decoloring processing in the decoloring apparatus; and an operation input unit configured to receive an operation input of the user, wherein the storing unit stores the identification information of the user who instructs execution of the decoloring processing, information indicating a department to which the user having the identification information belongs, and the information indicating the number of sheets determined as decoloring processing unexecutable by the decolorability determining unit, and if the identification-information acquiring unit acquires the identification information, the display control unit causes the display to screen-display a totalization result of the information stored in the storing unit indicating the number of sheets determined as decoloring processing unexecutable by the decolorability determining unit based on a totalization reference designated by the operation input unit, which is one of the identification information and the department to which the user having the identification information belongs.

Further, it is possible to provide a computer program for causing a computer included in the decoloring apparatus to execute the operations explained above. In this embodiment, as an example, the computer program for realizing a function of carrying out the present invention is recorded in advance in a storage area provided in the apparatus. However, the present invention is not limited to this. The same computer program may be downloaded from a network to the apparatus or the same computer program stored in a computer-readable recording medium may be installed in the apparatus. A form of the recording medium may be any form as long as the recording medium can store the computer program and can be read by the computer. Specifically, examples of the recording medium include an internal storage device internally mounted in a computer such as a ROM or a RAM, a portable storage medium such as a CD-ROM, a flexible disk, a DVD disk, a magneto-optical disk, or an IC card, a database that stores a computer program, other computers and databases of the computers, and a transmission medium on a line. A function obtained by installation or download in this way may be realized in cooperation with an OS (operating system) or the like in the apparatus.

The computer program may be an execution module that is dynamically generated partially or entirely.

It goes without saying that it is also possible to cause the ASIC 802 to execute, in terms of a circuit, at least a part of the various kinds of processing realized by causing the processor to execute the computer program in the embodiments.

It goes without saying that it is also possible to adopt a configuration for combining the first to fifth embodiments in a desired combination and realizing the embodiments according to necessity.

As explained above in detail, with the technique described in this specification, it is possible to provide an interface screen on which information concerning a processing state of decoloring processing in an decoloring apparatus is easily grasped.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decoloring apparatus comprising:
a sheet conveying unit configured to convey a sheet;
a decoloring unit configured to decolor an image formed with a decolorable colorant on the sheet conveyed by the sheet conveying unit;
a reading unit configured to, after the decoloring unit decolors the image, read the sheet conveyed by the sheet conveying unit and acquire an image;
a controlling unit configured to determine whether or not the sheet is reusable based on the image which the reading unit acquired;
a storing unit configured to store a first number of sheets which the controlling unit determines whether or not they are reusable, a second number of sheets determined to be reusable, and a third number of sheets determined to be unreusable; and
a display control unit configured to cause a display unit to display individually information indicating the second number of sheets, the third number of sheets and the reuse ratio of the second number of sheets to the first number of sheets.

2. The apparatus according to claim 1, wherein
if the sheet set as a detection target for determining whether or not the sheet is reusable by the controlling unit is determined to be unreusable, the controlling unit determines a reason for unreusabilty from a plurality of predetermined reasons for unreusablity, and
the display control unit causes, on the basis of the determination of the reason for unreusability result in the controlling unit, the display unit to display the number of sheets determined as unreusable because of each of the plurality of reasons for unreusablity in association with each of the plurality of reasons for unreusability.

3. The apparatus according to claim 2, wherein
the display control unit causes the display unit to display, in association with the reason for unreusability determined by the controlling unit, a predetermined advice content for improving a state of unreusability based on the determined reason for unreusability.

4. The apparatus according to claim 2, wherein
the display control unit causes, on the basis of the determination of the reason for unreusability result in the control unit, the display unit to display the number of sheets determined as unreusable because of each of the plurality of reasons for unreusability in association with each of the plurality of reasons for unreusability and causes the display unit to display a predetermined advice content for improving a state of unreusability based on a reason for unreusability that corresponds to the largest number of sheets determined as unreusable.

5. The apparatus according to claim 2, wherein
the predetermined reasons for unreusability comprises a remaining un-decolored image on a sheet, a bend in a sheet, a tear in a sheet and a residual object adhered to a sheet.

6. The apparatus according to claim 2, further comprising an identification information acquisition unit configured to acquire identification information of a user who instructs execution of the decoloring processing by the apparatus, wherein:
the storing unit stores the identification information of the user who instructs execution and an information indicating the the number of sheets determined to be unreusable by the controlling unit, in association with each other, and
if the identification information acquisition unit acquires the identification information of a user, the display control unit causes the display unit to display a totalization result corresponding to the user whom the identification information indicates, the totalization result of information stored in the storing unit indicating the third number of sheets determined to be unreusable by the controlling unit.

7. The apparatus according to claim 6, wherein
the storing unit stores an execution day of the decoloring processing and the third number of sheets determined to be unreusable by the controlling unit in association with each other,
the apparatus further comprises an operation input unit configured to receive an operation input of the user, wherein
if the operation input unit receives a display request for the totalization result for a unit period corresponding to one of a plurality of stored execution days, the display control unit causes the display unit to display the totalization result based on the corresponding stored execution day and the associated information stored in the storing unit indicating number of sheets determined to be unreusable by the controlling unit.

8. The apparatus according to claim 1, further comprising a contribution-ratio calculating unit configured to calculate a fourth number of sheets subjected to the decoloring processing by the decoloring unit and an environmental load contribution ratio calculated by multiplying the fourth number of sheets subjected to the decoloring processing with a specified coefficient, wherein
the display control unit is configured to cause a display unit to display the environmental load contribution ratio calculated by the contribution-ratio calculating unit.

9. The apparatus according to claim 8, wherein
the display control unit causes the display unit to display the environmental load contribution ratio by indicating a predetermined indicator area with a predetermined image.

10. The apparatus according to claim 9, wherein
the display control unit causes the display unit to display the environmental load contribution ratio based on a quantity of increase and decrease of predetermined change factor expected to increase and decrease according to $CO_2$ emissions.

11. The apparatus according to claim 8, further comprising an identification information acquisition unit configured to acquire identification information of a user who instructs execution of the decoloring processing by the apparatus, wherein
the storing unit stores the identification information of the user who instructs execution and an information indicating the environmental load contribution ratio calculated by the contribution-ratio calculating unit, in association with each other, and
if the identification information acquisition unit acquires the identification information of a user, the display control unit causes the display unit to display a totalization result corresponding to the user whom the identification information indicates, the totalization result of information stored in the storing unit indicating the environmental load contribution ratio calculated by the contribution-ratio calculating unit.

12. The apparatus according to claim 11, wherein
the storing unit stores an execution day of the decoloring processing and the information indicating the environmental load contribution ratio calculated by the contribution-ratio calculating unit, in association with each other,
the apparatus further comprises an operation input unit configured to receive an operation input of the user, wherein
if the operation input unit receives a display request for the totalization result for a unit period corresponding to one of a plurality of stored execution days, the display control unit causes the display unit to display the totalization result based on the corresponding stored execution day and the associated information stored in the storing unit indicating the environmental load contribution ratio calculated by the contribution ratio calculating unit.

13. The apparatus according to claim 1, further comprising a sensor configured to detect double feed of sheets or conveying bundle of sheets, wherein
the control unit determines whether or not the sheet is reusable based on the image which the reading unit acquired or the detection result in the sensor.

14. The apparatus according to claim 1, further comprising:
a number-of-printed-sheets-information acquiring unit configured to acquire information indicating a fourth number of sheets subjected to print processing in an image forming apparatus that can communicate with the decoloring apparatus; and
a decoloring processing-execution-ratio calculating unit configured to calculate a decoloring processing execution ratio that is a ratio of a fifth number of sheets subjected to the decoloring processing to the fourth number of sheets acquired by the number-of-printed-sheets-information acquiring unit, wherein
the display control unit causes the display unit to display the decoloring processing execution ratio.

15. The apparatus according to claim 1, further comprising a movement determining unit configured to determine whether or not the apparatus is doing warm up movement, wherein
the display control unit causes the display unit to display information indicating how to use at least one of the decoloring apparatus and an image forming apparatus, if the movement determining unit determines that the apparatus is doing warm up movement.

16. The apparatus according to claim 1, further comprising an identification information acquisition unit configured to acquire identification information of a user who instructs execution of the decoloring processing by the apparatus, wherein
the storing unit stores the identification information of the user who instructs execution and an information indicating the third number of sheets determined to be unreusable by the controlling unit in association with each other,
if the identification information acquisition unit acquires the identification information of a user, the display control unit causes the display unit to display a totalization result corresponding to the user whom the identification information indicates, the totalization result of information stored in the storing unit indicating the third number of sheets determined to be unreusable by the controlling unit.

17. The apparatus according to claim 16, wherein
the storing unit stores the identification information of the user who instructs execution and an information indicating the third number of sheets determined to be unreusable by the controlling unit in association with each other,
the apparatus further comprises an operation input unit configured to receive an operation input of the user,
if the operation input unit receives a display request for the totalization result for a unit period corresponding to one of a plurality of stored execution days, the display control unit causes the display unit to display the totalization result based on the corresponding stored execution day and the associated information stored in the storing unit indicating the third number of sheets determined to be unreusable by the controlling unit.

18. The apparatus according to claim 1, wherein
the storing unit stores an identification information of a user who instructs execution and an information indicating the third number of sheets determined to be unreusable by the controlling unit, in association with each other,
the apparatus further comprises an operation input unit configured to receive an operation input of the user, wherein
if the operation input unit receives a display request for a totalization result for a unit period corresponding to one of a plurality of stored execution days, the display control unit causes the display unit to display the totalization result based on the corresponding stored execution day and the associated information stored in the storing unit indicating the third number of sheets determined to be unreusable by the controlling unit.

19. The apparatus according to claim 1, wherein
the decolorable colorant can be heated and thereby decolorized.

20. A method for displaying processing information about a sheet which a decoloring apparatus processed, the decoloring apparatus comprising: a decoloring unit configured to decolor an image formed with a decolorable colorant on the sheet; and a reading unit configured, after the decolorino unit decolors the image, read the sheet conveyed and acquire an image, the method comprising:
determining whether or not the sheet is reusable based on the image which the reading unit acquired;
storing a first number of sheets that have been subiect to said determining, a second number of sheets determined to be reusable and a third number of sheets determined to be unreusable; and
causing a display unit to display individually the information indicating the second number, the third number and the reuse ratio of the second number of sheets to the first number of sheets.

21. The method according to claim 20, further comprising
if the sheet set as a detection target for determining whether or not the sheet is reusable is determined to be unreusable, determining a reason for unreusabilty from a plurality of predetermined reasons for unreusablity, and
causing, on the basis of the determination of the reason for unreusability result in the controlling unit, the display unit to display the number of sheets determined as unreusable because of each of the plurality of reasons for unreusablity in association with each of the plurality of reasons for unreusability.

22. The method according to claim 21, wherein
causing the display unit to display, in association with the reason for unreusability determined, a predetermined advice content for improving a state of unreusability based on the determined reason for unreusability.

23. The method according to claim 21, further comprising:
causing, on the basis of the determination of the reason for unreusability result in the control unit, the display unit to display the number of sheets determined as unreusable because of each of the plurality of reasons for unreusability in association with each of the plurality of reasons for unreusability, and
causing the display unit to display a predetermined advice content for improving a state of unreusability based on a reason for unreusability that corresponds to the largest number of sheets determined as unreusable.

24. The method according to claim 20, further comprising
calculating a fourth number of sheets subjected to the decoloring processing by the decoloring unit and the environmental load contribution ratio calculated by multiplying the fourth number of sheets subjected to the decoloring processing with a specified coefficient, and
causing a display unit to display the environmental load contribution ratio calculated.

25. The method according to claim 24, wherein causing the display unit to display the environmental load contribution ratio further comprises indicating a predetermined indicator area with a predetermined image.

26. The method according to claim 25, wherein causing the display unit to display the environmental load contribution ratio is based on quantity of increase and decrease of predetermined change factor expected to increase and decrease according to $CO_2$ emissions.

27. The method according to claim 20, wherein the decoloring apparatus further comprises a sensor configured to detect double feed of sheets or conveying bundle of sheets, the method further comprising determining whether or not the sheet is reusable based on the image which the reacting unit acquired or the detection result in the sensor.

28. The method according to claim 20 further comprising:
acquiring information indicating a fourth number of sheets subjected to print processing in an image forming apparatus that can communicate with the decoloring apparatus;
calculating a decoloring processing execution ratio that is a ratio of a fifth number of sheets subjected to the decoloring processing to the fourth number of sheets acquired by the number-of-printed-sheets-information acquiring unit; and
causing the display unit to display the decoloring processing execution ratio.

29. The method according to claim 20, further comprising:

determining whether or not the apparatus is doing warm up movement; and causing the display unit to display the information indicating how to use at least one of the decoloring apparatus and an image forming apparatus, if it is determined that the apparatus is doing warm up movement.

30. The method according to claim 20, further comprising:

acquiring identification information of a user who instructs execution of the decoloring processing by the apparatus;

storing the identification information of the user who instructs execution and an information indicating the third number of sheets determined to be unreusable, in association with each other; and causing the display unit to display a totalization result corresponding to the user whom the identification information indicates, the totalization result indicating the third number of sheets determined to be unreusable.

31. The method according to claim 30, further comprising:

storing an execution day of the decoloring processing and the third number of sheets determined to be unreusable, in association with each other, receiving a a display request for the totalization result for a unit period corresponding to one of a plurality of stored execution days; and causing the display unit to display the totalization result based on the corresponding stored execution day and the third number of sheets determined to be unreusable.

* * * * *

UNITED STATES PATENT AND TRADEMARK OFFICE
CERTIFICATE OF CORRECTION

PATENT NO. : 8,899,705 B2  Page 1 of 1
APPLICATION NO. : 13/069285
DATED : December 2, 2014
INVENTOR(S) : Ken Iguchi et al.

It is certified that error appears in the above-identified patent and that said Letters Patent is hereby corrected as shown below:

On the title page item 57 in line 8 of the Abstract, please delete "readinq" and replace with "reading".

In the specification

In column 3, line 27, please delete "decolorinq" and replace with "decoloring".

In the claims

In claim 20, column 27, line 59, please delete "decolorino" and replace with "decoloring".

In claim 31, column 29, line 22, please delete "receiving a a display" and replace with "receiving a display".

Signed and Sealed this
Sixteenth Day of February, 2016

Michelle K. Lee
*Director of the United States Patent and Trademark Office*